United States Patent
Okamoto

[11] Patent Number: 6,108,067
[45] Date of Patent: *Aug. 22, 2000

[54] LIQUID CRYSTAL DISPLAY ELEMENT HAVING OPPOSITE SIGNAL VOLTAGE INPUT DIRECTIONS

[75] Inventor: Shigetsugu Okamoto, Kashiwa, Japan

[73] Assignees: Sharp Kabushiki Kaisha, Osaka, Japan; The Secretary of State for Defense in Her Britannic Majesty's Government of the United Kingdom of Great Britain and Northern Ireland, Hants, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/769,102

[22] Filed: Dec. 18, 1996

[30] Foreign Application Priority Data

Dec. 27, 1995 [JP] Japan ................................ 7-341878

[51] Int. Cl.⁷ .................... G02F 1/133; G02F 1/1333; G02F 1/1345
[52] U.S. Cl. ................ 349/152; 349/33; 349/85; 349/149; 349/151; 349/152; 257/59; 257/758
[58] Field of Search ................... 349/33, 139, 149, 349/147, 85, 151, 152; 257/59, 758

[56] References Cited

U.S. PATENT DOCUMENTS

| | | | |
|---|---|---|---|
| 4,745,403 | 5/1988 | Tamura | 340/713 |
| 4,818,078 | 4/1989 | Mouri et al. | 349/147 |
| 5,029,984 | 7/1991 | Adachi et al. | 349/149 |
| 5,317,437 | 5/1994 | Ktakura | 349/144 |
| 5,712,493 | 1/1998 | Mori et al. | 349/139 |
| 5,723,908 | 3/1998 | Fuchida et al. | 257/758 |

FOREIGN PATENT DOCUMENTS

| | | |
|---|---|---|
| 0287055 | 10/1988 | European Pat. Off. . |
| 361981 | 4/1990 | European Pat. Off. . |
| 0466378 | 1/1992 | European Pat. Off. . |
| 0471460 | 2/1992 | European Pat. Off. . |
| 0694900 | 1/1996 | European Pat. Off. . |
| 3-050591 | 3/1991 | Japan . |
| 3-174134 | 7/1991 | Japan . |
| 4-062520 | 2/1992 | Japan . |
| 4-115286 | 4/1992 | Japan . |
| 4-172319 | 6/1992 | Japan . |
| 6-019422 | 1/1994 | Japan . |
| 7-056537 | 3/1995 | Japan . |
| 2173625 | 10/1986 | United Kingdom . |

*Primary Examiner*—Kenneth Parker
*Assistant Examiner*—Julie Ngo
*Attorney, Agent, or Firm*—Renner Otto Boisselle & Sklar LLP

[57] ABSTRACT

A liquid crystal display element is arranged so that a scanning line electrode group and a signal line electrode group, which are formed by arranging a plurality of electrodes parallel, are placed in a direction where they intersect each other, and liquid crystal intervenes between these electrode groups, and input directions of signal voltages to be applied to the signal line electrode group are opposite in some electrode. As a result, nonuniformity of temperature on a display screen, which is caused by heat generation according to driving of the liquid crystal and causes variations of a driving property of the liquid crystal, is suppressed, and thus a satisfactory display state is realized.

5 Claims, 24 Drawing Sheets

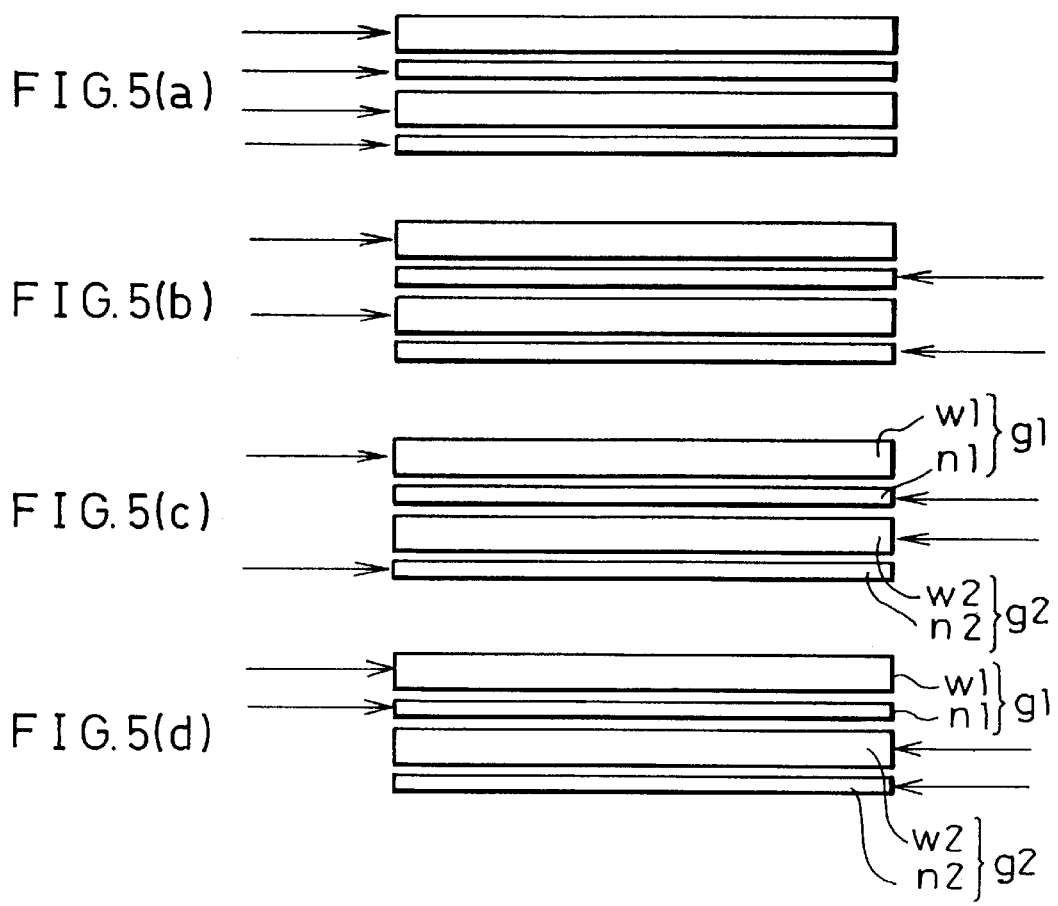

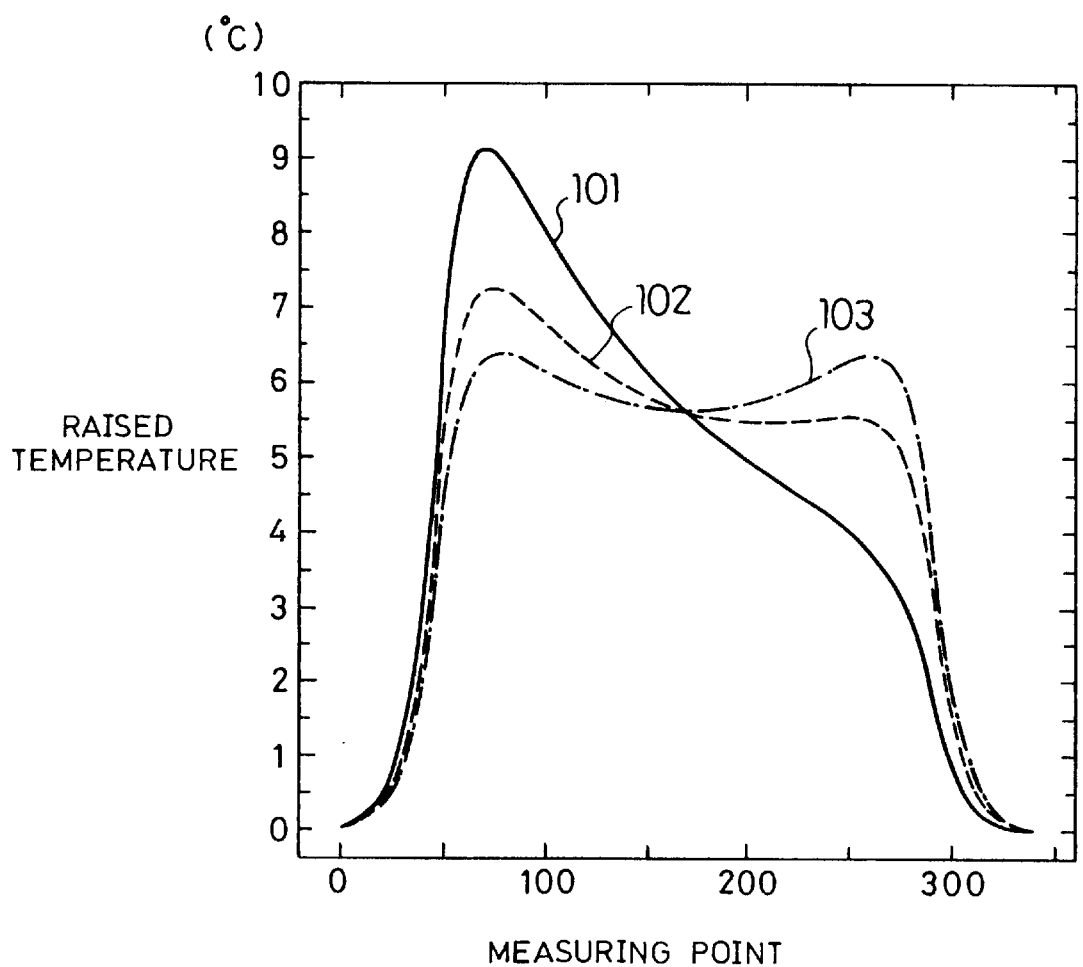

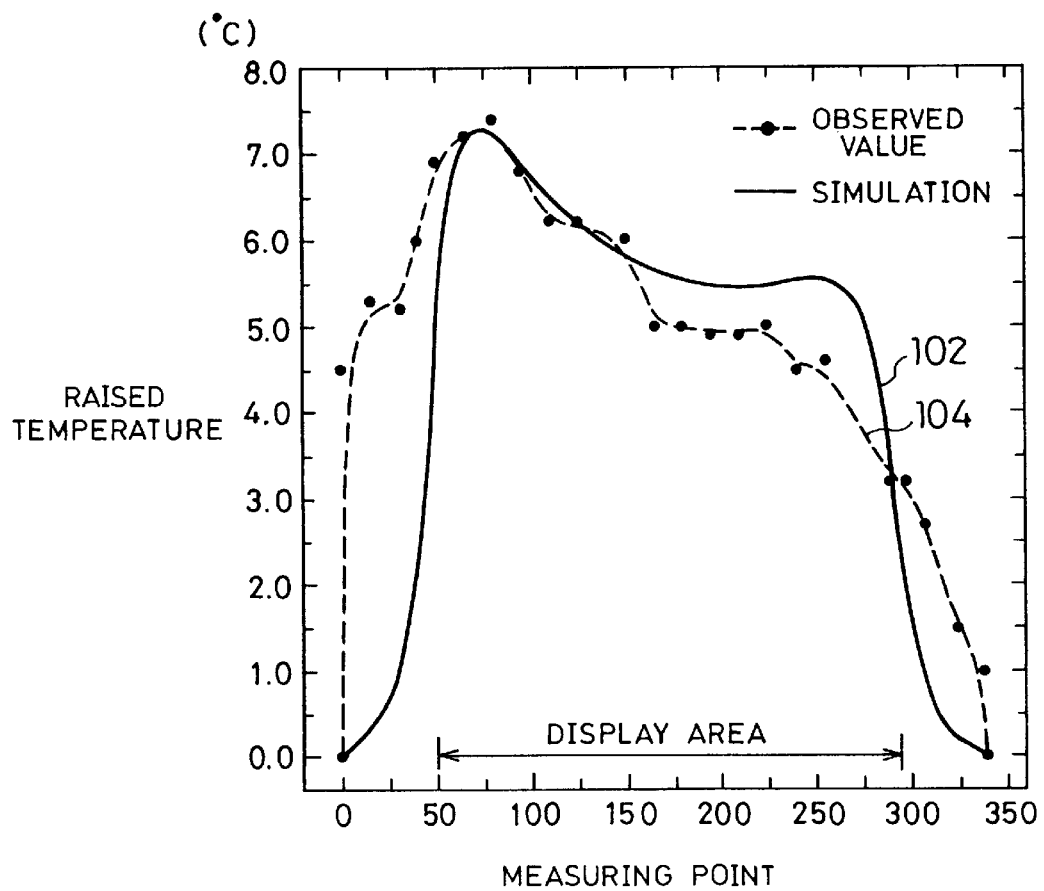

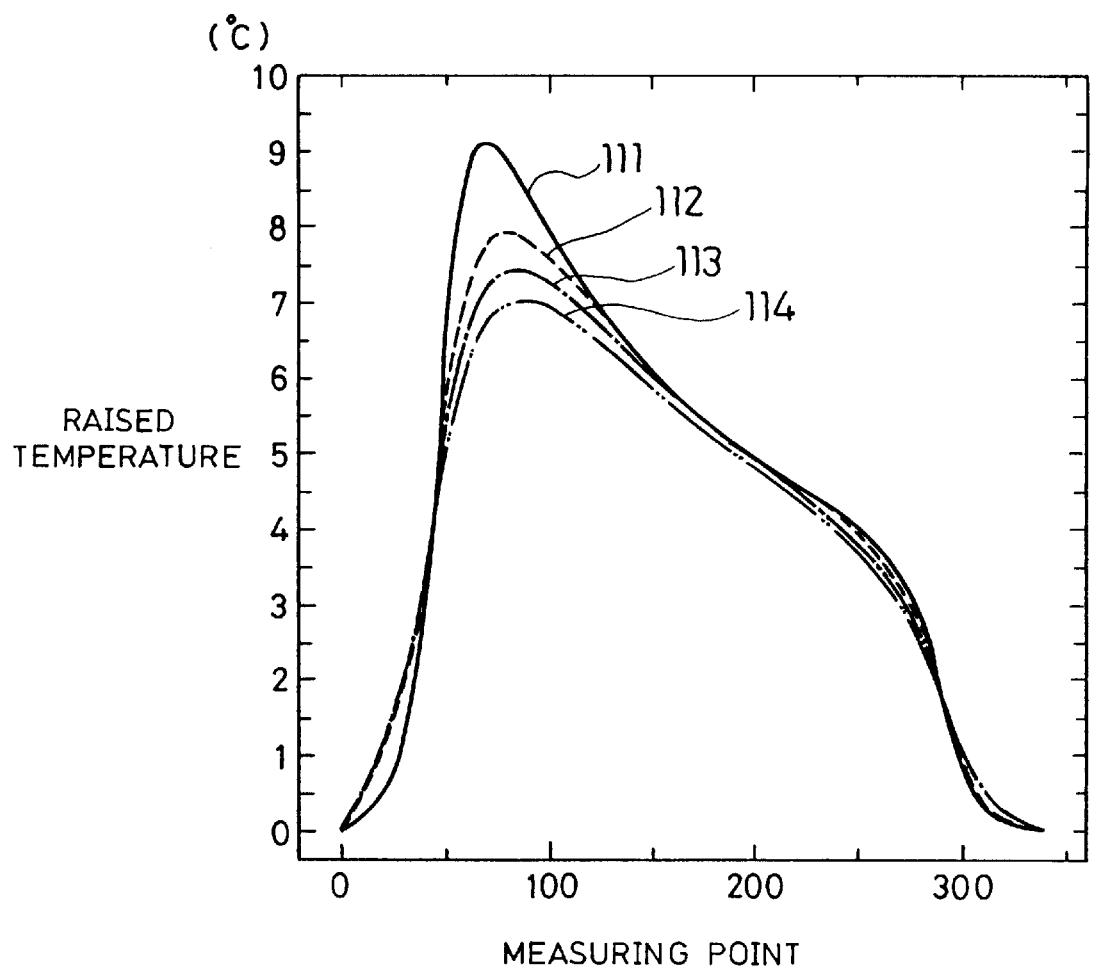
F I G. 11

LIQUID CRYSTAL DISPLAY ELEMENT HAVING OPPOSITE SIGNAL VOLTAGE INPUT DIRECTIONS

FIELD OF THE INVENTION

The present invention relates to a liquid crystal display element, more specifically, an arrangement which suppresses heat generation of the liquid crystal display element according to driving of liquid crystal.

BACKGROUND OF THE INVENTION

In a liquid crystal display element, in order to make a display property of a liquid crystal screen uniform, it is desirable to reduce nonuniformity of a temperature of a liquid crystal panel as small as possible. The heat generation is caused mainly by heat conduction from a driving power source or a back light. Besides the above heat conduction, a liquid crystal panel also generates a heat by application of a signal voltage.

In a liquid crystal display panel using a nematic liquid crystal (NLC), the heat generation from the liquid crystal panel is too small to be worth considering because a capacitance of a panel is low, a driving voltage is low, i.e. about 5 V, and a driving frequency is low, i.e. about several kHz. For this reason, in this case, the heat which influences the display property is caused mainly by heat conduction from a heat generating source such as a driving power source and a back light. Therefore, in the liquid crystal display device using NLC, in order to suppress the heat conduction from the heat generating source as low as possible, and to maintain a temperature distribution on the liquid crystal panel uniform, the following attempts are made.

For example, Japanese Unexamined Patent Publication No. 4-115286/1992 (Tokukaihei 4-115286) discloses an arrangement that a heat from a heat generating source is agitated by forced convection such as a fan and is released out of a display device. Moreover, Japanese Unexamined Patent Publication No. 3-174134/1991 (Tokukaihei 3-174134) discloses an arrangement that heat conduction from a heat generating source to a liquid crystal panel is cut off by a heat pipe. Furthermore, Japanese Unexamined Patent Publication No. 4-62520/1992 (Tokukaihei 4-62520) discloses an arrangement that heat generation of a back light is absorbed and diffused by a coolant. Moreover, Japanese Unexamined Patent Publications No. 3-50591/1991 and 4-172319/1992 (Tokukaihei 3-50591 and 4-172319) disclose an arrangement that a partial heat conduction is prevented by using a heat diffusing plate which diffuses a heat from a back light.

The above arrangements disclosed in each Publication prevent a heat generated in inner or outer apparatuses such as a back light from being conducted to a liquid crystal panel, and this prevents the display property from becoming nonuniform due to temperature change of the liquid crystal.

The smaller power consumption is, the smaller the calorific value becomes. For this reason, as a technique that suppresses the power consumption of a driving circuit so as to make a calorific value small, two arrangements are known: an arrangement disclosed in Japanese Unexamined Patent Publication No. 6-19422/1994 (Tokukaihei 6-19422) that power supply to a liquid crystal display driver is intermittently suspended, and an arrangement disclosed in Japanese Unexamined Patent Publication No. 7-56537/1995 (Tokukaihei 7-56537) that a useless power on a circuit configuration is limited. These arrangements are mainly used as means for controlling the heat generation of the driving circuit.

However, in the above conventional arrangements, the heat generation of the liquid crystal display element due to the driving of liquid crystal is not considered. In recent years, a liquid crystal display device in which a thickness of a liquid crystal layer of a liquid crystal display element (cell thickness) is thin, such as a liquid crystal display element using surface stabilized ferroelectric liquid crystal (SSFLC) or the like is known. In such a liquid crystal display element, a temperature distribution on a panel becomes nonuniform because the liquid crystal display element functions as a heat generating source at the time of driving the liquid crystal, and thus such a problem that a uniform display state cannot be obtained arises easily.

A calorific value of the liquid crystal display element depends upon charge and discharge electric currents generated in picture elements. The calorific value becomes larger in a portion of the liquid crystal display element which is closer to an input terminal of a signal line voltage, and becomes smaller in a portion of the liquid crystal display element which is farther from the input terminal of the signal line voltage. This is because each picture element on the signal line electrode of the liquid crystal display element can be represented as a capacitor-resistor (CR) circuit, a voltage waveform to be applied to each picture element is close to an applied voltage waveform near the input terminal, but the waveform becomes less steep as the portion is farther from the input terminal, and thus the charge and discharge electric currents become small because a rising of the voltage gets slow. As mentioned above, when the distribution of the calorific value on the liquid crystal display element becomes nonuniform, a difference in temperature on the panel occurs. The difference in temperature on the panel produces a problem that the driving property of the liquid crystal is made nonuniform, and thus the display property of an image is deteriorated.

In the conventional liquid crystal display element using NLC, the influence of the heat generation on the liquid crystal display element is an order of $\frac{1}{100}$ of the liquid crystal display element using SSFLC. This is because a capacitance, namely, a capacitive load of the panel is small since a cell thickness of NLC is thicker than SSFLC, and the driving frequency of the liquid crystal is not more than several kHz, and the driving voltage during a non-selecting period is low, i.e. not more than about 5 V.

On the contrary, the cell thickness of an SSFLC panel, for example, is 1–2 $\mu$m, namely, it has a thinner thickness than the several $\mu$m cell thickness of the NLC panel, and a capacitance of the SSFLC panel is larger than a general NLC panel. In other words, the capacitive load of the SSFLC panel is larger than the NLC panel. Moreover, in the SSFLC panel, the driving frequency is an order of dozens to hundred kHz, and the driving voltage of about 5 to 15 V is required for the non-selecting period. According to these points, in the liquid crystal display element having a thin cell thickness, even if no heat conduction from a back light or a voltage source occurs, since the calorific value of the liquid crystal display element is comparatively large, there is a difference in temperature of several 0° C. depending on a portion of the display screen. This difference in temperature causes variations of the driving property of the liquid crystal in the display screen, and thus there arises a problem of nonuniform display.

SUMMARY OF THE INVENTION

The present invention is invented from a viewpoint of the above problem, and it is an object of the present invention to provide a liquid crystal display element which is capable of preventing variations of the driving property of liquid crystal due to heat generation of the liquid crystal display element at the time of driving the liquid crystal and providing uniform display.

In order to achieve the above object, a liquid crystal display element of the present invention, in which a scanning line electrode group and a signal line electrode group which are composed of a plurality of electrodes being arranged parallel are located so as to cross each other and liquid crystal intervenes between the electrode groups, wherein an input direction of signal voltages to be applied to some signal line electrodes of the signal line electrode group is set oppositely.

In the above liquid crystal display element, the signal voltages to be applied to some signal line electrodes are applied from an opposite direction to those to be applied to other signal line electrodes. At the time of driving the liquid crystal, a calorific value of each picture element positioned on one signal line electrode is higher as the picture element is in a position which is closer to an input terminal of the signal voltage. For this reason, the calorific value on each section of the display screen of the liquid crystal display element can be averaged by setting the input direction of the signal voltages to some electrodes oppositely on the signal line electrode group formed by arranging a plurality of electrodes parallel as mentioned above. As a result, the nonuniformity of temperature which exerts a bad influence upon the driving property of the liquid crystal is suppressed, and thus it is possible to provide the liquid crystal display element which obtains the satisfactory display state.

In addition, in order to achieve the above object, a liquid crystal display element of the present invention in which liquid crystal intervenes between a scanning line substrate and a signal line substrate to which a plurality of electrodes are respectively provided, wherein at least one of the substrates is formed according to a partial calorific value obtained by driving the liquid crystal so that a thickness is relatively thicker in a portion where the calorific value is larger and is relatively thinner in a portion where the calorific value is smaller.

The temperature of each section on the display screen of the liquid crystal display element is influenced by a total calorific value per a unit volume including heat transfer to the outside. Namely, in order to average the temperature of each section on the display screen of the liquid crystal display element, the volume of a portion where the calorific value is larger may be increased relatively with respect to the other portions. In accordance with the arrangement of the above liquid crystal display element, by making the thickness of at least one of the scanning line substrate and the signal line substrate comparatively thicker in a portion where the calorific value is larger, and making the thickness relatively thinner in a portion where the calorific value is smaller, the temperature of each section on the display screen is averaged. As a result, nonuniformity of the temperature which exerts a bad influence on the driving property of the liquid crystal is suppressed, and a liquid crystal display element which obtains a satisfactory display state can be realized.

In addition, in order to achieve the above object, a liquid crystal display element of the present invention, in which liquid crystal intervenes between a scanning line substrate and a signal line substrate to which a plurality of electrodes are respectively provided, wherein at least one of the substrates is formed according to a partial calorific value obtained by driving the liquid crystal so that a surface area is relatively larger in a portion where the calorific value is larger and is relatively smaller in a portion where the calorific value is smaller.

The temperature of each section on the display screen of the liquid crystal display element is influenced by a total calorific value per unit volume including heat transfer to the outside. Namely, in order to average the temperature of each section on the display screen of the liquid crystal display element, the surface area of a portion where the calorific value becomes larger is made to increase relatively with respect to the other portions so that efficiency of the heat transfer to the outside can be improved. In accordance with the arrangement of the above liquid crystal display element, by making the surface area of at least one of the scanning line substrate and the signal line substrate comparatively larger in a portion where the calorific value is larger, and making the surface area relatively smaller in a portion where the calorific value is smaller, the temperature of each section on the display screen is averaged. As a result, nonuniformity of the temperature which exerts a bad influence on the driving property of the liquid crystal is suppressed, and a liquid crystal display element which obtains a satisfactory display state can be realized.

In addition, in order to achieve the above problem, a liquid crystal display element of the present invention in which a scanning line electrode group and a signal line electrode group which are composed of a plurality of electrodes being arranged parallel are located so as to cross each other and liquid crystal intervenes between the electrode groups, has charge and discharge current suppressing means for dulling steepness of a rectangular waveform of signal voltages to be applied to the signal line electrodes.

In the above liquid crystal display element, picture elements are formed in the position where the scanning line electrodes and the signal line electrodes cross each other, and contents to be displayed on the picture elements are applied as signal voltages. Steepness of the waveform of the signal voltages is dulled by the charge and discharge current suppressing means. The heat is generated on each picture element at the time of driving the liquid crystal due to the charge and discharge current generated when the polarities of the signal voltages are changed, and as the changing ratio of the polarities of the signal voltages becomes larger, a larger amount of the charge and discharge current is generated. For this reason, the calorific value of each picture element at the time of driving the liquid crystal can be decreased by suppressing the charge and discharge current by the charge and discharge current suppressing means. Therefore, power consumption is suppressed, and the nonuniformity of temperature which causes the variations of the driving property of the liquid crystal is suppressed, and thus the liquid crystal display element which obtains the satisfactory display state can be provided.

For fuller understanding of the nature and advantages of the invention, reference should be made to the ensuing detailed description taken in conjunction with the accompanying drawings.

BRIEF DESCRIPTION OF THE DRAWINGS

FIG. 5(a) is a schematic drawing which shows applying directions of the signal voltages to the signal line electrodes in the conventional liquid crystal panel; and FIGS. 5(b) through 5(d) are schematic drawings which show examples of the applying directions of the signal voltages to the signal line electrode group shown in FIG. 4.

FIG. 8 is a graph which shows raised temperatures of the liquid crystal panel at each measuring point according to input methods of the signal voltages to the signal line electrode group.

FIG. 9 is a graph which shows the raised temperatures of the liquid crystal panel at each measuring point by comparing simulation results with the observed values.

FIG. 11 is a graph which shows results of obtaining the raised temperatures of the liquid crystal panel having a wedge-shaped substrate at each measuring point.

DETAILED DESCRIPTION OF THE PREFERRED EMBODIMENTS

EMBODIMENT 1

The following describes one embodiment of the present invention in reference to FIGS. 1 through 9.

Here, the description will be given as to an arrangement which averages a temperature distribution in a display screen by devising input directions of signal voltages to be applied to the signal line electrode group in the liquid crystal panel shown in FIG. 1, for example. Since the liquid crystal panel is thin, it is considered that there is no difference in temperature between the inside and the surface of the panel. Therefore, hereinafter, the temperature of the surface of the liquid crystal panel is referred to as a panel temperature.

Figure 1:
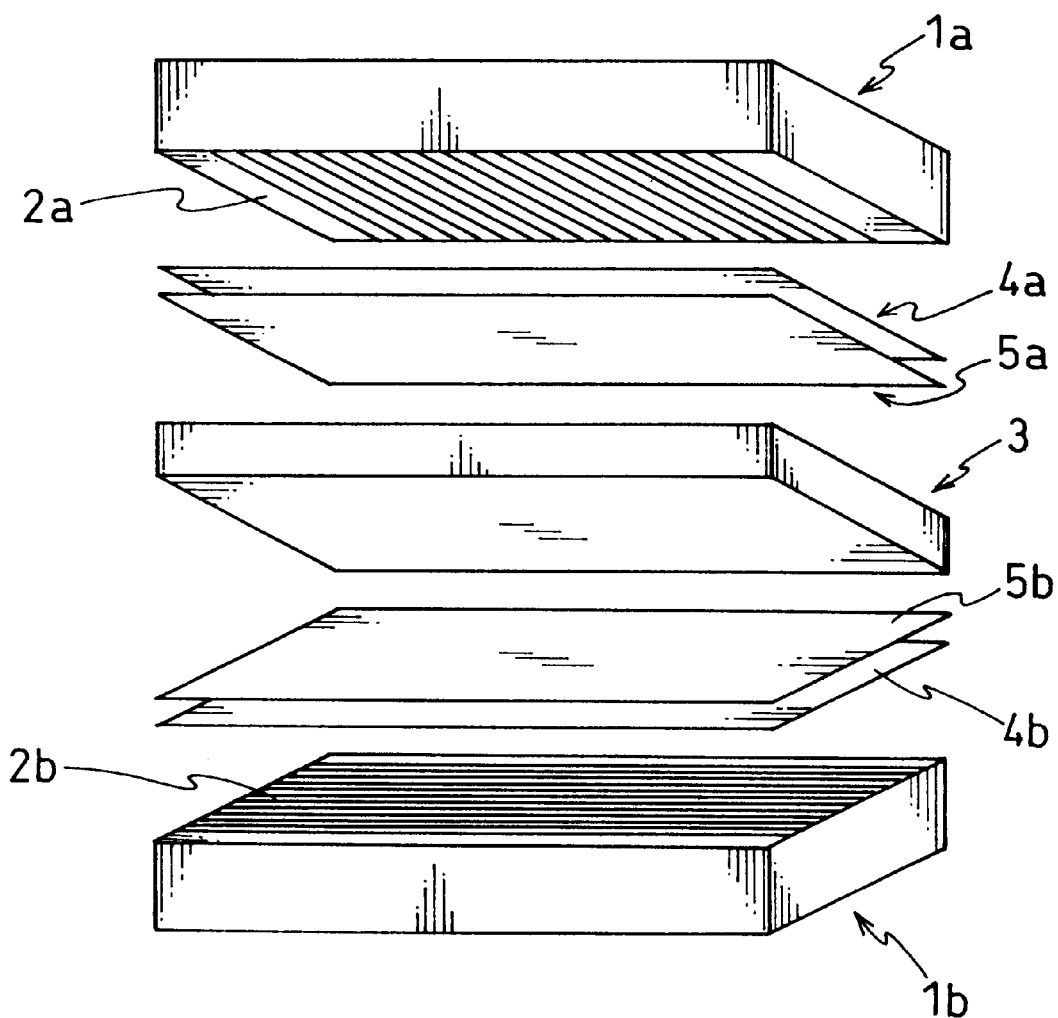
FIG. 1 is an explanatory drawing which shows a schematic arrangement of a liquid crystal panel according to one embodiment of the present invention.

As shown in FIG. 1, the liquid crystal panel as one embodiment is arranged so that a plurality of transparent electrodes are positioned parallel with each other on a signal line electrode substrate 1a and a scanning line electrode substrate 1b, a signal line electrode group 2a and a scanning line electrode group 2b are formed, the substrates 1a and 1b face each other in a direction where the electrode groups 2a and 2b perpendicularly cross, and a liquid crystal material 3 is sealed between the substrates 1a and 1b. Moreover, insulating films 4a and 4b or alignment films 5a and 5b or the like can be provided between the liquid crystal material 3 and the substrates if necessary.

Figure 2:
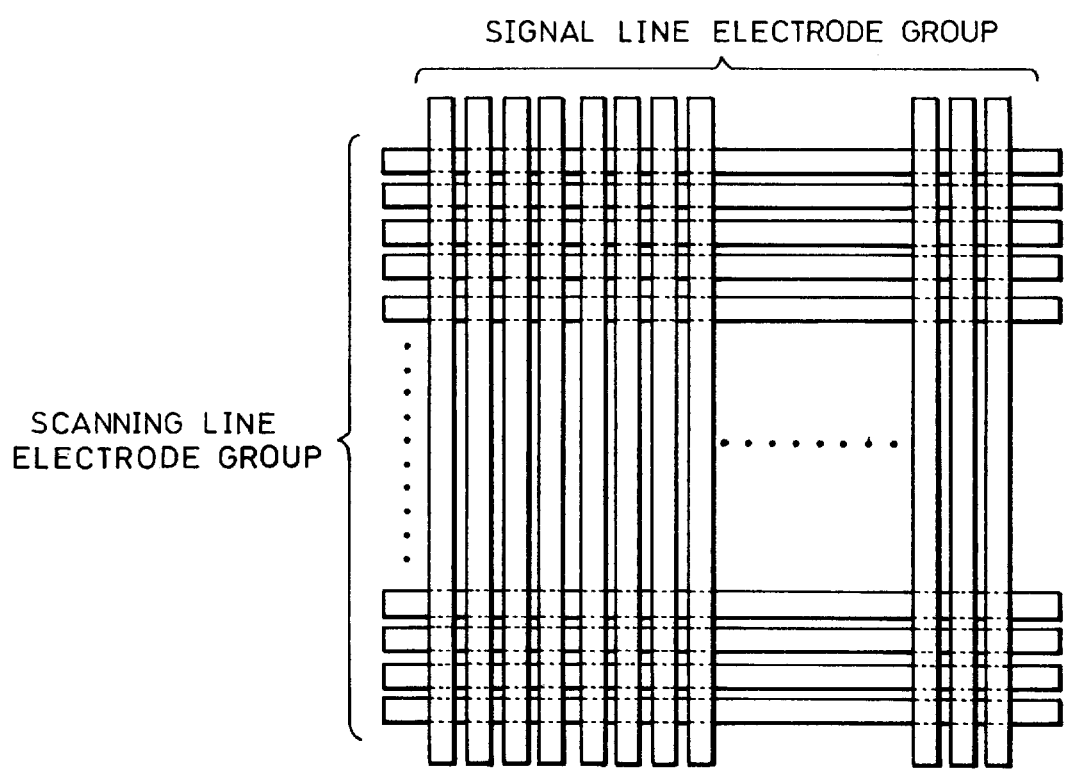
FIG. 2 is a plan view which shows one example of arrangements of a signal line electrode group and a scanning line electrode group provided to the liquid crystal panel shown in FIG. 1.
Figures 6A, 6B:
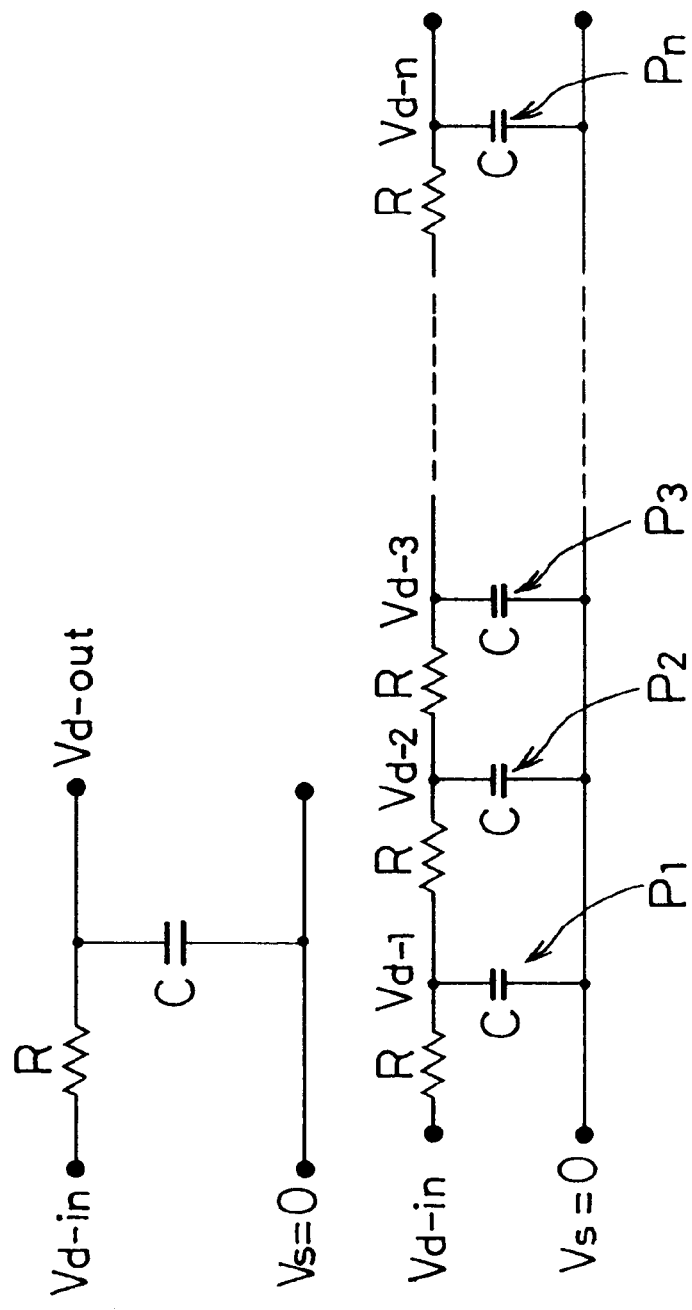
FIG. 6(a) is a circuit diagram which shows an equivalent circuit of one picture element in the liquid crystal panel.
FIG. 6(b) is a circuit diagram which shows an equivalent circuit of each picture element arranged on one signal line electrode in the liquid crystal panel shown in FIG. 2.

First, according to FIG. 2, the following describes a liquid crystal panel having an arrangement that transparent electrodes having the same width are positioned in a grid pattern. In this liquid crystal panel, an electrical equivalent circuit of one picture element is shown approximately by a configuration in FIG. 6(a). Namely, each picture element of the liquid crystal panel has a capacitance C [F] and an electrode resistance value R[Ω]. Moreover, a voltage $V_S$ in FIG. 6(a) shows a voltage of the scanning line electrode (here, $V_S$=0), and a voltage $V_{d-in}$ shows a voltage of the signal to be inputted to the picture elements. Namely, a voltage of a rectangular wave which drives the picture elements is $V_{d-in}$. Moreover, a voltage $V_{d-out}$ shows a signal voltage to be practically applied to the picture elements.

In addition, as shown in FIG. 6(b), picture elements $P_1$, $P_2$, ... $P_n$ which are distributed on the signal line electrodes can be shown as a multistage ladder distributed constant circuit. In FIG. 6(b), the voltages $V_{d-1}$, $V_{d-2}$, ... $V_{d-n}$ show signal voltages to be applied to the picture elements $P_1$, $P_2$, ... $P_n$.

A calorific value of each picture element in the circuit shown in FIG. 6(b) can be represented by the following equation 1.

$$Q(n) = -\frac{2CV_d^2 F_{LAT}}{\pi}\{\ln(n^2 CR_{ito} F_{LAT}) + \gamma - n^2 CR_{ito} F_{LAT} + \cdots\}[W] \quad \text{Equation 1}$$

In the equation 1, Q(n) shows the calorific value [W] in the n-numbered picture element from an input terminal of the signal line electrode. Moreover, C is the capacitance [F] per one picture element, $V_d$ is the voltage [V] of the rectangular wave which drives the liquid crystal, $F_{LAT}$ is a line address frequency [Hz], $R_{ito}$ is the electrode resistance value [Ω] per one picture element, and γ is an Euler's constant (0.57721 ...). As is clear from the equation 1, the larger the value n becomes, the smaller the calorific value Q(n) becomes. Namely, as a picture element is closer to the input terminal of the signal line electrode, the calorific value of the picture element becomes larger, and as a picture element is farther from the input terminal, the calorific value of the picture element becomes smaller.

As is clear from the heat generation distribution represented by the equation 1, as the picture elements respectively arranged on the signal line electrode are closer to the input terminal, they have a larger calorific value. For this reason, as shown in FIG. 3(b), in the case of a general view of the liquid crystal panel, the calorific value in the longitudinal direction of the signal line electrode can be averaged by the driving circuit having such a configuration that the input directions of the signal voltages to the signal line electrodes are opposite alternately. As a result, the driving property of the liquid crystal can be averaged, thereby making it possible to obtain an uniform image.

Figure 3A:
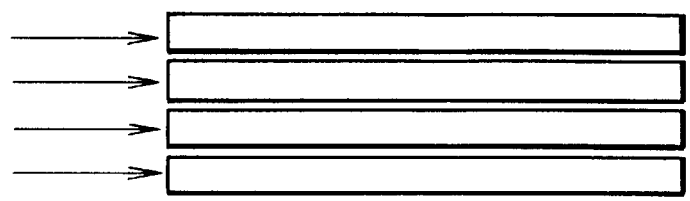
FIG. 3(a) is a schematic drawing which shows applying directions of signal voltages to a signal line electrode group in a conventional liquid crystal panel.
Figure 3B:
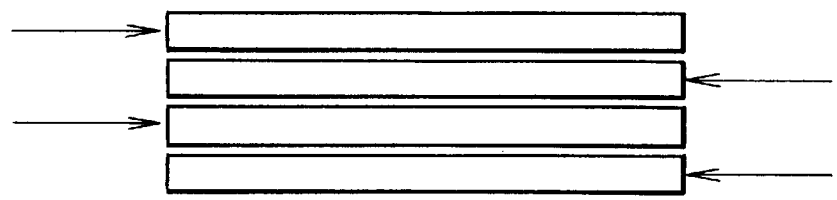
FIG. 3(b) is a schematic drawing which shows applying directions of signal voltages to the signal line electrode group shown in FIG. 2.

On the contrary, like a conventional liquid crystal panel, in the case where the input directions of the signal voltages to the signal line electrodes are same on all the signal line electrodes as shown in FIG. 3(a), the temperature of the panel on a side of the input terminal of the signal voltage becomes higher than the opposite side. Therefore, the driving property of the liquid crystal easily becomes nonuniform, and thus it is difficult to obtain the uniform display state.

Figure 4:
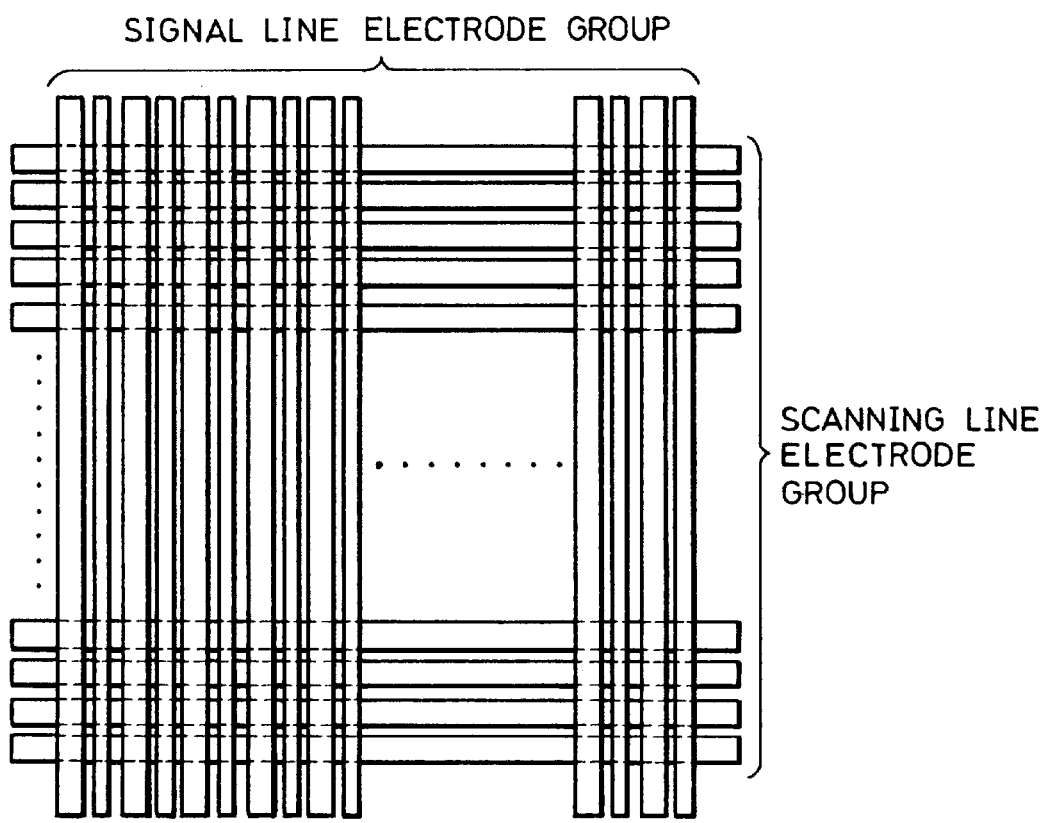
FIG. 4 is a plan view which shows another example of the arrangements of the signal line electrode group and the scanning line electrode group provided to the liquid crystal panel shown in FIG. 1.

In addition, as shown in FIG. 4, also in the case where the liquid crystal panel which is provided with the signal line electrode group arranged by positioning two types of signal line electrodes each of which have different widths alternately and executing tone display using the picture elements having two kinds of areas, the temperature of the panel can be approximately uniform by arranging the input directions of the signal voltages so that they become opposite alternately as shown in FIG. 5(b).

In addition, more preferably, when the driving circuit has the configuration of the input directions shown in FIG. 5(c), the temperature difference on the panel surface can be smaller. Namely, as shown by arrows in FIG. 5(c), the input directions of the signal voltages to the signal line electrodes w1 with wider width and to the signal line electrodes n1 with narrower width which is adjacent to the signal line electrodes w1 are arranged so as to be opposite to each other. Furthermore, the one signal line electrode with wider width and the one signal line electrode with narrower width which is adjacent to the signal line electrode with wider width make a pair, and the input directions of the signal voltages to the same type of adjacent two signal line electrodes are made opposite. Namely, when an electrode set g1 composed of the signal line electrode w1 and the signal line electrode n1 is compared with a an electrode set g2 composed of the signal line electrode w2 and the signal line electrode n2, the driving circuit may be arranged so that the input directions to the signal line electrode w1 and the signal line electrode w2 are opposite to each other, and the input directions to the signal line electrode n1 and the signal line electrode n2 are also opposite to each other.

In another way, the liquid crystal panel may have the arrangements of the input directions shown in FIG. 5(d). Namely, the arrangements shown in FIGS. 5(c) and 5(d) are equivalent to each other geometrically, and they have the same temperature distribution. Moreover, both of the liquid crystal panels having the above arrangements can easily connect each signal line electrode to the driving circuit.

As mentioned above, when the input directions of the signal voltages to the signal line electrodes are set as shown in FIGS. 5(b), 5(c) or 5(d), the temperature difference on the panel surface can be small, and the generation of variations of the driving property on the liquid crystal can be suppressed.

Here, the equation of heat conduction in a portion of the liquid crystal panel surface is represented in the following equation 2.

$$\frac{\partial T(x, y, z, t)}{\partial t} = a\nabla^2 T(x, y, z, t) + \frac{Q(x, y, z, t)}{c\rho} \quad \text{Equation 2}$$

A coordinate x represents a distance in a direction which is parallel with the signal line electrodes, a coordinate y represents a distance in a direction which is parallel with the scanning line electrodes, a coordinate z represents a distance in a direction which is perpendicular to the liquid crystal panel surface, and t is elapsed time. Moreover, a $(=\lambda/c\rho)$ is a diffusivity of heat [m$^2$/s], ρ is density [kg/m$^3$], c is specific heat [J/kgK], λ is heat conductivity [W/mK], Q(x,y,z,t) is a total heat generation [W/m$^3$] including heat conduction to the outside per unit area, and T(x,y,z,t) is temperature [K].

Figure 7:
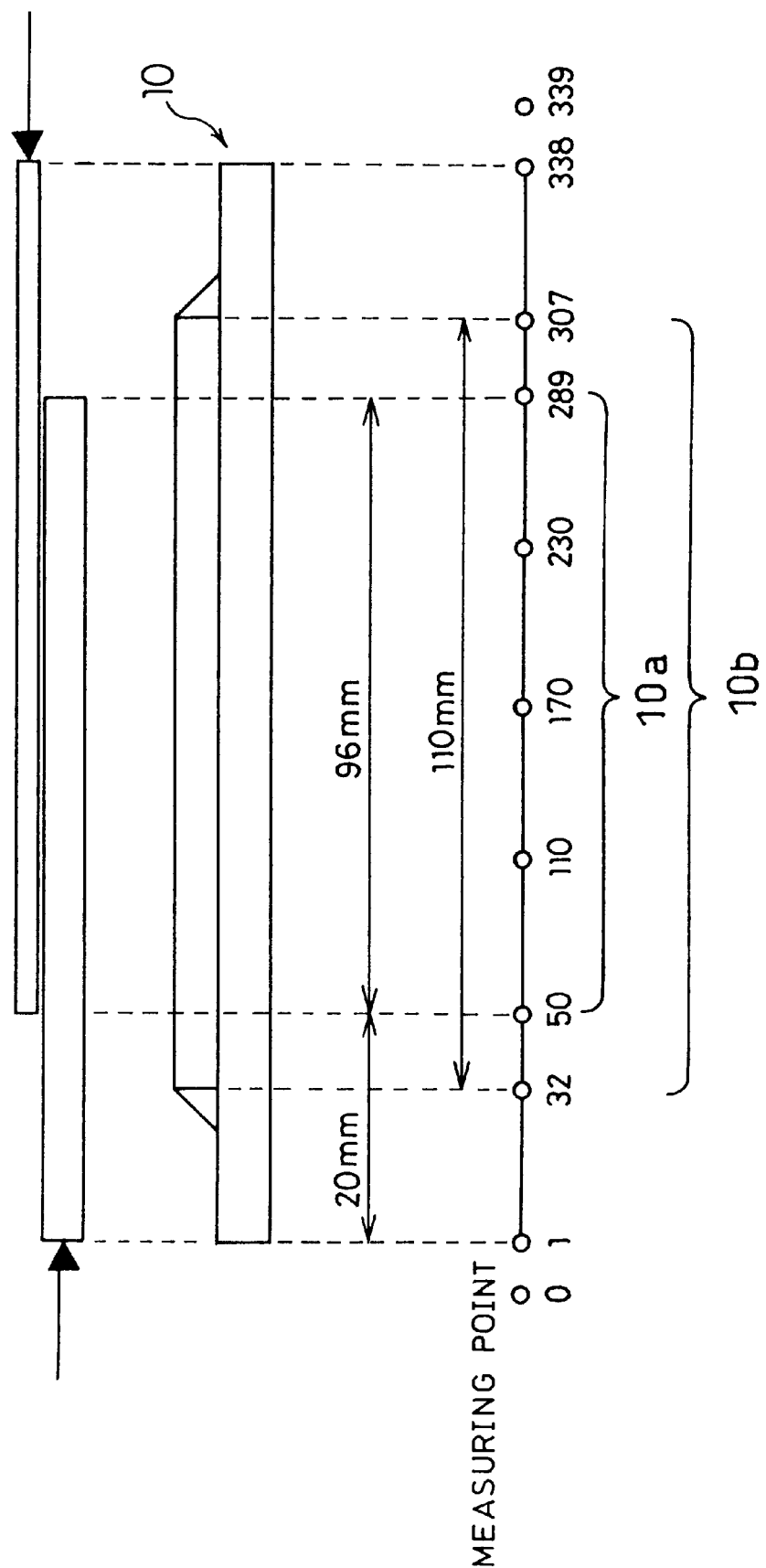
FIG. 7 is an explanatory drawing which shows a position of each measuring point used for measuring a temperature distribution, etc. on a screen of the liquid crystal panel.

The following describes the results of estimating the raised temperatures based upon the equations 1 and 2. FIG. 7 is an explanatory drawing which shows positions of the measuring points provided along longitudinal directions of the signal line electrodes on a liquid crystal panel 10 used as a measurement model. On the liquid crystal panel 10, a display area 10a on which an image is displayed has a width of 96 mm in the longitudinal direction of the signal line electrodes, and a panel area 10b of the liquid crystal panel 10 has a width of 110 mm. Moreover, guide areas of 20 mm are respectively provided to both the outer ends of the display area 10a. Here, the measuring points #0 through 339 were provided along the longitudinal directions of the signal line electrodes. As shown in FIG. 7, the measuring points #50 through 289 are provided to the display area 10a of the liquid crystal panel 10. Moreover, the measuring points #0 and 339 are provided in order to measure an air temperature.

FIG. 8 is a graph which shows results of calculating the raised temperature at each measuring point on the liquid crystal panel 10 according to the equations 1 and 2. Here, as shown in FIG. 4, in order to execute tone display, the liquid crystal panel 10 has the signal line electrode group which is composed of two types of electrodes having different widths which are positioned alternately.

A graph 101 shown by a solid line is a comparative example, and it shows the result of calculating the raised temperatures at each measuring point in the case where all the input direction of the signal voltages to the signal line electrodes are set so as to be uniform as shown in FIG. 5(a) according to the equations 1 and 2. Moreover, a graph 102 shown by a broken line shows the raised temperatures at each measuring point in the case where the input directions of the signal voltages are set as shown in FIG. 5(b), and a graph 103 shown by alternate long and short dash lines shows the raised temperatures at each measuring point in the case where the input directions of the signal voltages are set as shown in FIG. 5(c).

As is clear from comparing the graphs 101, 102 and 103 with each other, as shown in FIG. 5(b) or 5(c), when the input directions of the signal voltages on some electrodes are made opposite to the other electrodes, the temperature difference in the display area of the liquid crystal panel becomes small, and the highest temperature in all the measuring points can be lowered. According to the graph 101 which is shown as a comparative example, when all the input directions of the signal voltages to the signal line electrode group are made uniform, a temperature difference of maximumly 6° C. arises in the display area of the liquid crystal panel. As a result, it is clear that the uniform display on the whole screen cannot be expected.

In addition, as is clear from comparing the graphs 102 and 103 with each other, in the case of the arrangement that two types of electrodes with different widths are positioned alternately, the temperature difference in the display area becomes more uniform in the arrangement of the input directions shown in FIG. 5(c) than the arrangement of the input direction shown in FIG. 5(b), and as a result, the highest temperature becomes lower.

In addition, as shown in FIG. 2, if the signal line electrode group of the liquid crystal panel 10 is composed of electrodes having the same width, in the case where the signal voltages to these electrodes is inputted from the same direction as shown in FIG. 3(a), the graph of the raised temperatures at each measuring point coincides with the graph 101 in FIG. 8. Meanwhile, in the case where the input directions of the signal voltages are opposite alternately as shown in FIG. 3(b), the graph of the raised temperatures at each measuring point coincides with the graph 103 in FIG. 8.

The graphs in FIG. 8 are the simulation results based upon the equations 1 and 2, but the following explains the result of measuring the temperature using the liquid crystal panel practically according to FIG. 9. Here, the liquid crystal panel used for the measurement has the same condition as the simulation of the graph 102 in FIG. 8. Namely, the input directions of the signal voltage to the signal line electrodes are set as shown in FIG. 5(b).

The result of measuring the raised temperatures at each measuring point under the above condition is shown by a broken line (graph 104) in FIG. 9. Moreover, for comparison, the graph 102 shown in FIG. 8 is put in FIG. 9. As is clear from the measured values (graph 104), the temperature difference in the display area (#50 through 289) of the liquid crystal panel falls within about 2° C.

In FIG. 9, the measured values (graph 104) in the vicinity of both the ends of the panel does not coincide with the simulation results (graph 102), and this is because the temperature distribution in the air from the panel end to a point at infinity in the equation 2 is not considered at the simulation. However, since the position of the measuring point representing the highest temperature in the liquid crystal panel between the graph 104 and the graph 102 agree with each other, and the distribution shape of the raised temperature between the graph 104 and graph 102 agree with each other within the range of a measuring error, the simulations according to the equations 1 and 2 can be appropriate.

As mentioned above, as shown in FIG. 3(b), 5(b), 5(c) or 5(d), when the input directions of the signal voltages to the signal line electrode group are changed oppositely in some signal line electrodes, the temperature distribution on the display screen of the liquid crystal panel can be averaged, and thus the driving property of the liquid crystal can be prevented becoming uneven. As a result, it is possible to provide the liquid crystal panel which obtains a satisfactory display state.

EMBODIMENT 2

The following describes another embodiment of the present invention on reference to FIGS. 10 through 17. Here, those members that have the same arrangement and functions, and that are described in the aforementioned embodiment are indicated by the same reference numerals and the description thereof is omitted. The same is applied to another embodiment, mentioned later.

The temperature of each section on the display screen of the liquid crystal panel can be obtained according to the equation 2 described in the embodiment 1. According to the equation 2, important elements of the heat conduction are a calorific value per unit volume and efficiency of heat transfer to an air. Since the heat generation distribution in the equation 1 is determined by a physical property value of liquid crystal and a resistance value of ITO transparent electrode of a panel, the distribution shape of heat generation cannot be changed basically even if the physical property value is changed. Therefore, the liquid crystal panel of the present embodiment controls a contribution of the heat transfer to the panel by adjusting the calorific value per unit volume and a heat radiating amount per unit area shown in the equation 2.

Figure 10A:
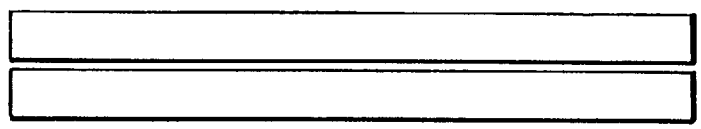
FIG. 10(a) is a cross sectional view which shows shapes of a conventional scanning line electrode substrate and signal line electrode substrate.
Figure 10B:
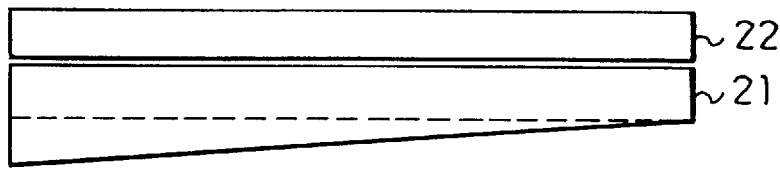
FIGS. 10(b) through 10(d) are cross sectional views which show examples of shapes of a scanning line electrode substrate and signal line electrode substrate provided to a liquid crystal panel according to another embodiment of the present invention.

Concretely, as to the signal line electrode substrate on which the signal line electrodes are positioned and the scanning line electrode substrate on which the scanning line electrodes are positioned, the cross section of the signal line electrode substrate 21 has a wedge shape as shown in FIG. 10(b). This cross section is obtained by cutting the substrate in a direction which is parallel with the longitudinal direction of the signal line electrodes and perpendicularly cross the longitudinal direction of the scanning line electrode. Moreover, in this case, as explained in the embodiment 1, since a picture element which is closer to the input terminal of the signal line electrode has larger calorific value at the time of driving the liquid crystal, the input terminal of the signal voltage is positioned in the side where a plate thickness is thicker.

Figure 10C:
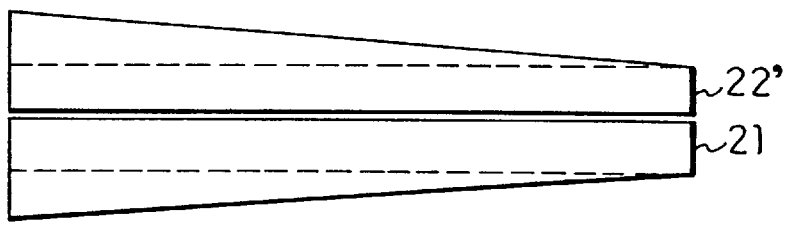

In another way, as shown in FIG. 10(c), the liquid crystal panel may be arranged so as to have, instead of the scanning line electrode substrate 22 in FIG. 10(b), a scanning line electrode substrate 22' having a wedge shape like the signal line electrode substrate 21. Also with this arrangement, the input terminal of the signal voltage to the signal line electrodes is positioned in the side where the panel thickness is thicker.

Figure 10D:
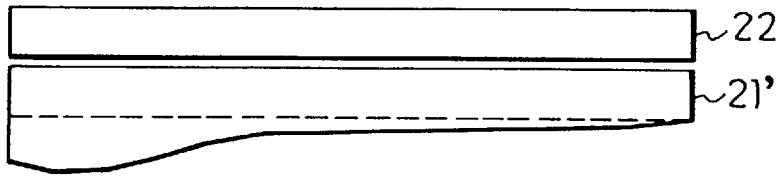

In the arrangement shown in FIG. 10(b) or 10(c), the signal line electrode substrate 21 and the scanning line electrode substrate 22' are formed so as to become gradually thinner according to the distance from the input terminal of the signal voltage, namely, so that a changing ratio of the substrate thickness becomes substantially constant. Moreover, as shown in FIG. 10(d), the temperature distribution on the substrate can be made constant also by using a signal line electrode substrate 21' having a thickness according to the calorific value on the portion of the substrate.

The following explains the result of measuring the temperature distribution on the substrate in the case where the changing ratio of the substrate thickness is set variously according to several types of conditions on the liquid crystal panel having the substrate shown in FIG. 10(c) on reference to FIG. 11. Here, as shown in FIG. 5(a), the liquid crystal panel which is used for the measurement is arranged so that all the input directions of the signal voltages to the signal line electrode group become equal. Moreover, the setting positions of each measuring point are as shown in FIG. 7.

Four graphs 111 through 114 shown in FIG. 11 respectively show the results of the measurements under the respective following conditions. The measurements were taken at the measuring points #0 through 338, but as shown in FIG. 7, the liquid crystal panel actually has only a thickness for one substrate at the measuring points #1 thorough 32, and #307 through 338, and the thickness of the panel at these measuring points are thinner than the panel area 10b (#32 through 307). For this reason, the measured values at the measuring points #1 through 32 and #307 through 338 are corrected so as to correspond to a thickness for two substrates. In all measurements hereinafter, this correction is made. Moreover, the graph 111 shown by a solid line is a comparative example, and as shown in FIG. 10(a), it shows the measured result in the case where the panel thickness is made uniform (2 mm).

The graph 112 shown by a broken line in FIG. 11 shows the measured result in the case where the substrate is formed so that the panel thickness at the measuring point #1 is 6 mm, and the panel thickness at the measuring point #338 is 2 mm. Moreover, the graph 113 shown by a alternate long and short dash lines shows the measured result in the case where the substrate is formed so that the panel thickness at the measuring point #1 is 8 mm and the panel thickness at the measuring point #338 is 4 mm. Furthermore, the graph 114 shown by alternate a long and two short dashes lines shows the measured result in the case where the substrate is formed so that the panel thickness at the measuring point #1 is 10 mm and the panel thickness at the measuring point #338 is 5 mm.

As is clear from FIG. 11, when comparing with the arrangement that the panel thickness is uniform as shown in FIG. 10(a), the arrangement that the panel thickness is changed according to calorific values can reduce a raised temperature difference on the liquid crystal panel smaller. As a result, the temperature distribution on the panel surface can be more uniform, thereby making it possible to suppress the variations of the driving property of the liquid crystal.

Figure 12:
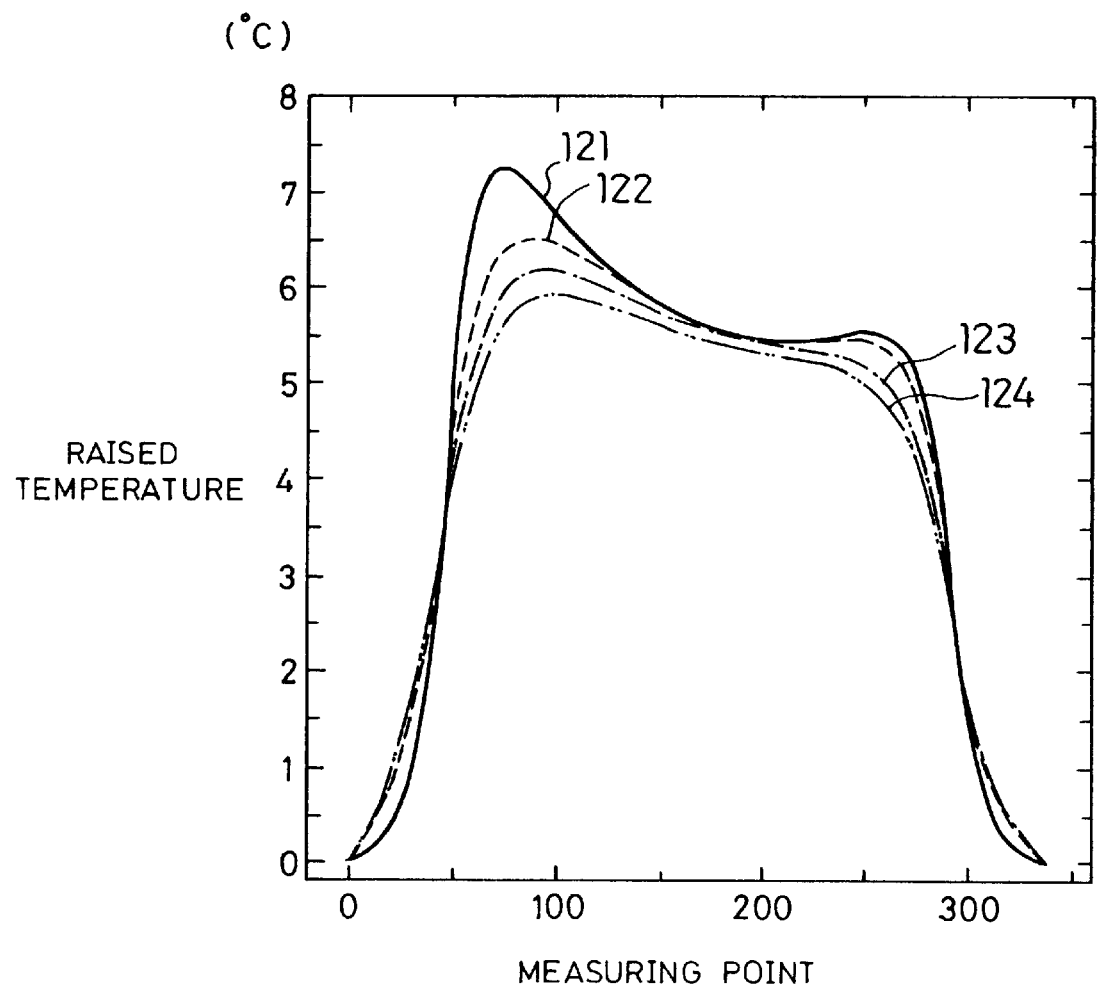
FIG. 12 is a graph which shows the raised temperatures at each measuring point in the case where the input directions of the signal voltages are opposite alternately in the liquid crystal panel having a wedge-shaped substrate.

In addition, FIG. 12 shows a result of measuring the raised temperatures at each measuring point in the case where the same condition of the panel thickness as FIG. 11 is set, and the input directions of the signal voltages to the signal line electrodes are opposite alternately as shown in FIG. 5(b). Namely, the panel thickness of the liquid crystal panel used for the measurement in the graphs 121 through 124 in FIG. 12 is the same as the model used for the measurement in the graphs 111 through 114 in FIG. 11.

As is clear by comparing the graphs shown in FIGS. 11 and 12, the temperature difference in the display area of the liquid crystal panel can be effectively suppressed by combining the arrangement described in embodiment 1 that all the input directions of the signal voltages to the signal line electrode group are opposite alternately with the arrangement that the thickness of the substrate is changed according to calorific values due to the driving of the liquid crystal.

Figure 13A:
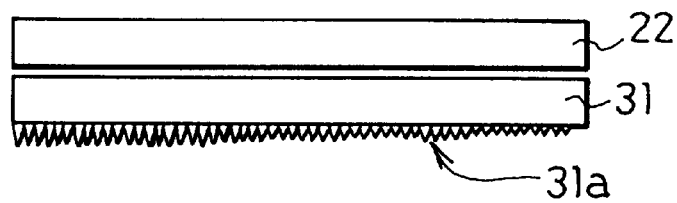
FIG. 13(a) is a cross sectional view which shows an arrangement that a protrusion is provided to a back surface of the substrate according to calorific values.
Figure 13B:
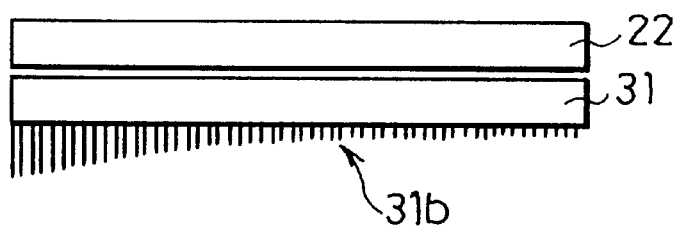
FIG. 13(b) is a cross sectional view which shows an arrangement that a radiating fin is provided to the back surface of the substrate according to the calorific values.

The above explained as to the arrangement that the temperature of the liquid crystal panel is averaged by changing the thickness of the substrate, but instead of this arrangement, as shown in FIGS. 13(a) and 13(b), the temperature of the substrate can be averaged also by forming a protrusion 31a and a radiating fin 31b on the back surface of a signal line substrate 31 and by increasing a radiating surface of a portion where a calorific value is large. Here, the input terminal, not shown, of the signal voltages to the signal line electrode group, provided on the signal line substrate 31, is provided to the left side in FIGS. 13(a) and 13(b).

The shape and density of the protrusion 31a and the radiating fin 31b may be determined after considering the radiating efficiency and the heat generating distribution so that the temperature distribution on the substrate becomes uniform, namely, the radiating surface becomes large in a portion where the calorific value is large, and the radiating surface becomes small in a portion where a calorific value is small. For example, as mentioned above, since a picture element which is closer to the input terminal of the signal voltage has a larger calorific value at the time of driving the liquid crystal, as shown in FIG. 13(a), a large protrusion is provided to a portion which is closer to the input terminal of the signal voltages, namely, the left side in the drawing, and as shown in FIG. 13(b), a radiating fin having a large surface is provided to the left side in the drawing.

The protrusion 31a and the radiating fin 31b may be formed as one component by using the same material as the signal line substrate 31, or they may be formed separately so as to be stuck to the signal line substrate 31 by adhesives or the like. Moreover, their material is not limited to the same material as the signal line substrate 31, so various materials can be used as long as they allow a visible light to transmit sufficiently.

As mentioned above, the temperature distribution on the substrate can be averaged, and at the same time the raise in temperature of the liquid crystal panel is saturated rapidly by changing the thickness of the substrate and the radiating surface according to the calorific values.

In addition, as shown in FIGS. 10(b) through 10(d), the substrate where the thickness is changed according to the calorific values may be combined with one of the protrusion and the radiating fin. In another way, both the protrusion and the radiating fin may be formed on the substrate shown in FIGS. 10(b) through 10(d) where the thickness is changed according to the calorific values.

In addition, the liquid crystal panel can be arranged by combining the arrangement explained in embodiment 1 that the input directions of the signal voltages to the signal electrode group are made opposite on some electrodes with the above-mentioned arrangement that at least one of the substrate thickness and the radiating surface is changed according to the calorific values, thereby making it possible to further average the temperature distribution in the display area of the liquid crystal panel. As a result, the driving property of the liquid crystal, namely, a display property can be averaged.

Figure 14:
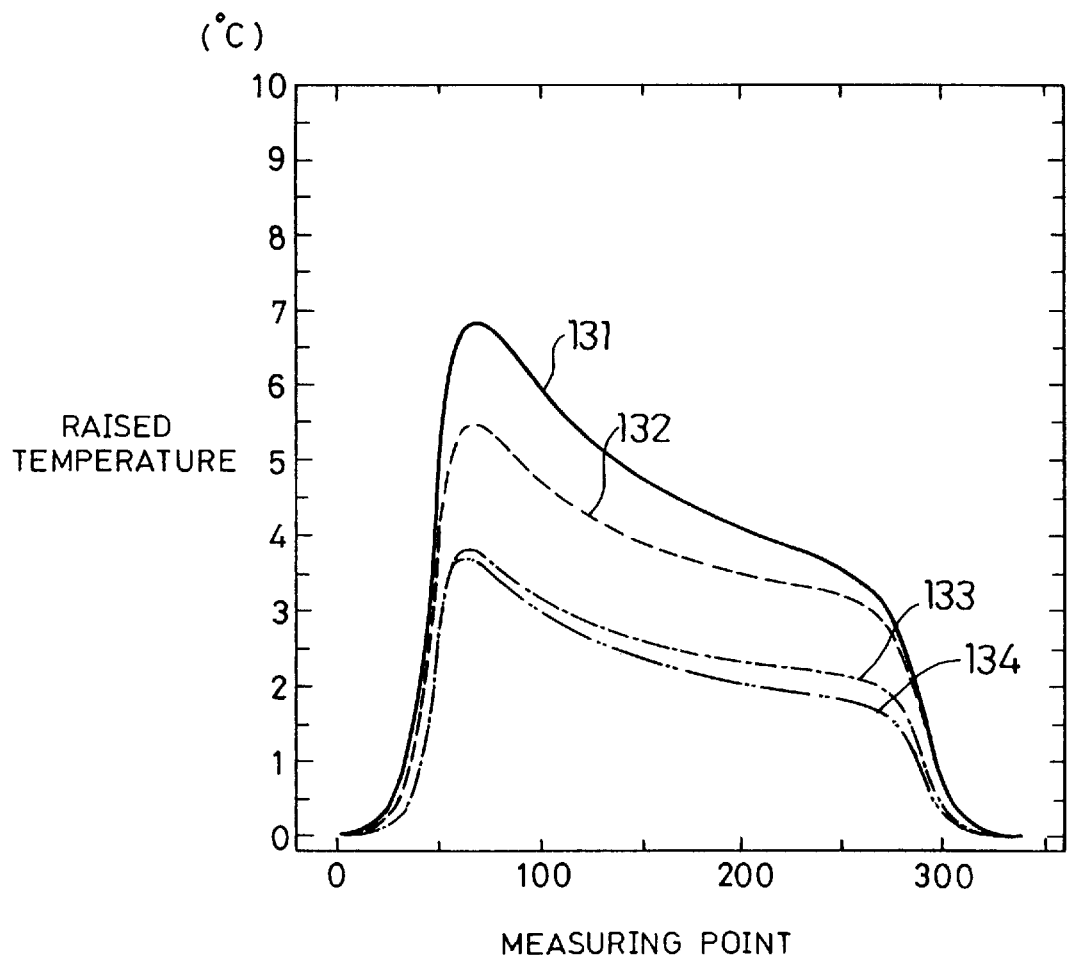
FIG. 14 is a graph which shows the raised temperatures at each measuring point in the case where a surface area of the substrate is changed according to the calorific values.

The following explains the results of predicting the raised temperature in the arrangement that the radiating area of the substrate is changed according to the calorific values on reference to FIG. 14. FIG. 14 approximately shows the temperature distribution on the liquid crystal panel. This is because in the case where the surface area of the substrate is changed according to a location, the coefficient of the heat transfer to the outside is not always in proportion to the surface area, and the heat transfer coefficient is also influenced by the shape of the substrate. However, in the case where the shape of the substrate does not have a complicated structure but a comparatively simple structure, since the coefficient of the heat transfer to the outside can be regarded to be approximately in proportion to the surface area of the substrate, the heat transfer to the outside is calculated assuming that the coefficient of the heat transfer is in proportion to the increase in the surface area of the substrate.

The graphs 131 through 134 shown in FIG. 14 are obtained under the following conditions. On the liquid crystal panel to be used for the measurement in the graphs, the input directions of the signal voltages to the signal line electrode group are uniform as shown in FIG. 5(a).

First, the graph 131 shows the raised temperatures at each measuring point in the case where the protrusion or the radiating fin is provided to the back surface of the substrate so that the surface area on the end of the substrate where the calorific value is large is increased by 1.5 times, and where nothing is provided to the other end of the substrate where the calorific value is small.

The graph 132 shows the raised temperatures at each measuring point in the case where the protrusion or the radiating fin is provided to the back surface of the substrate so that the surface area on the end of the substrate where the calorific value is large is increased by 2 times, and where nothing is provided to the other end of the substrate where the calorific value is small.

The graph 133 shows the raised temperatures at each measuring point in the case where the protrusion or the radiating fin is provided to the back surface of the substrate so that the surface area on the end of the substrate where the calorific value is large is increased by 3 times and that the surface area on the other end of the substrate where the calorific value is small is increased by 1.5 times.

Furthermore, the graph 134 shows the raised temperature at each measuring point in the case where the protrusion or the radiating fin is provided to the back surface of the substrate so that the surface area on the end of the substrate where the calorific value is large is increased by 3 times and that the surface area on the other end of the substrate where the calorific value is small is increased by 2 times.

As is clear from the comparison of the graphs 131 through 134, the temperature difference on the liquid crystal panel can be made small and the rise in temperature according to the heat generation due to driving of the liquid crystal can be made small by increasing the radiating area on the location where the calorific value is large.

In addition, as is clear from the comparison of each graph in FIG. 11 and the graphs 131 through 134, the temperature distribution on the substrate can be made more uniform. Moreover, in this case, the time required for stabilization of the panel temperature is shortened from about 10 min. to about 3 min. compared with the case where the conventional liquid crystal panel having a uniform thickness (2 mm) is used.

Figure 15:
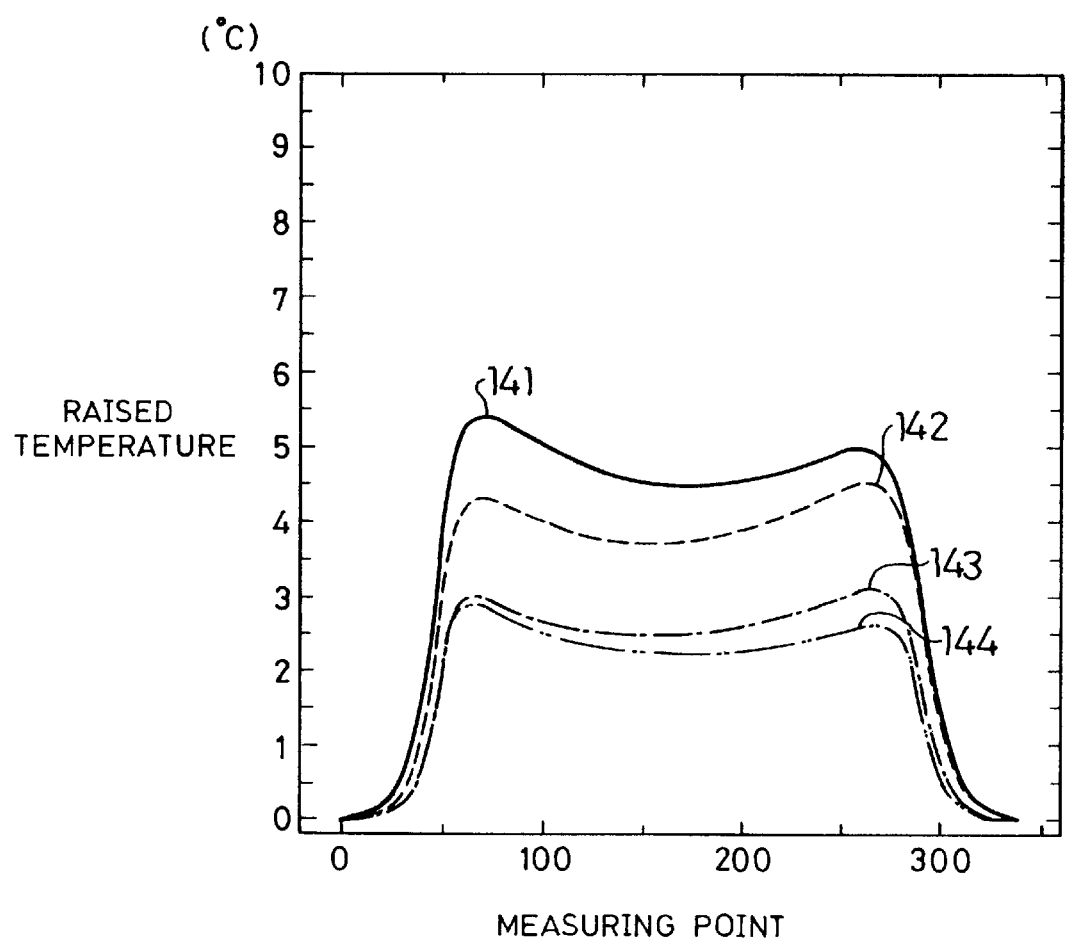
FIG. 15 is a graph which shows the raised temperatures at each measuring point in the case where the surface area of the substrate is changed according to the calorific values, and the input directions of the signal voltages to the signal line electrode group are opposite alternately.

Next, FIG. 15 shows the result of obtaining the raised temperatures at each measuring point in the arrangement shown in FIG. 5(b) that the input directions of the signal voltages to the signal line electrode group are opposite alternately under the same condition as the case of obtaining the graphs 131 through 134 in FIG. 14. Namely, the respective conditions of the surface area on the substrate in the graphs 141 through 144 in FIG. 15 are the same as those in the graphs 131 through 134 shown in FIG. 14.

As is clear from the comparison of the graphs shown in FIGS. 14 and 15, the temperature difference in the display area of the liquid crystal panel can be suppressed more effectively by combining the arrangement described in embodiment 1 that the input directions of the signal voltages to the signal line electrode group are opposite alternately with the arrangement that the surface area of the substrate is changed according to the calorific values. Moreover, according to each graph in FIG. 15, it can be read that the highest temperature in the display area is suppressed.

Figure 16:
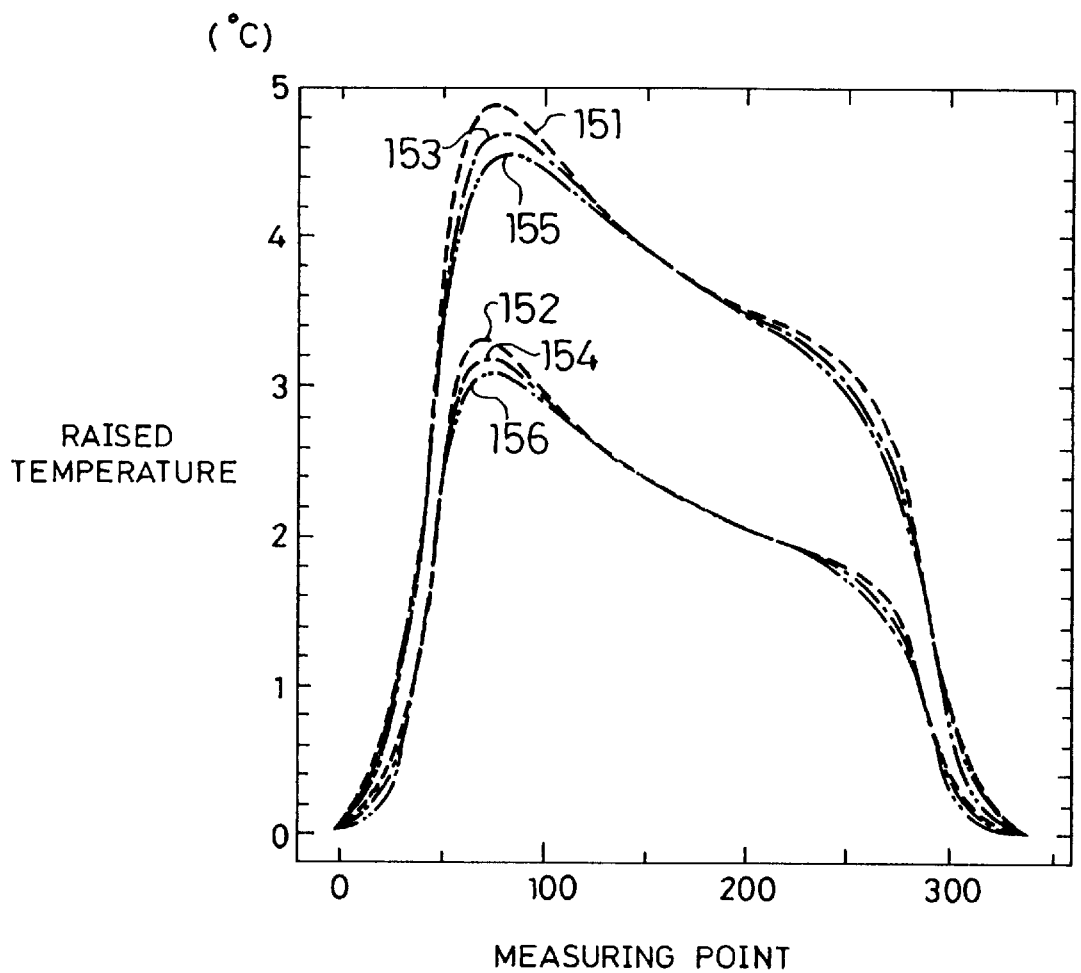
FIG. 16 is a graph which shows the raised temperatures at each measuring point in the case where the thickness and the surface area of the substrate are changed according to the calorific values.

Next, FIG. 16 shows the raised temperatures at each measuring point in the case where the protrusion or the radiating fin is provided to the aforementioned arrangement, i.e., the substrate whose thickness is changed according to the calorific values.

Six graphs 151 through 156 shown in FIG. 16 are obtained under the conditions shown in Table 1. Here, in the liquid crystal panel which is used for the measurement in each graph, the input directions of the signal voltages to the signal line electrodes are uniform as shown in FIGS. 3(a) or 5(a).

TABLE 1

|  | Panel thickness (mm) | | Surface area (times) | |
| --- | --- | --- | --- | --- |
|  | # 1 | # 338 | # 1 side | # 338 side |
| 151 | 6 | 2 | 2 | 1 |
| 152 | 6 | 2 | 3 | 2 |
| 153 | 8 | 4 | 2 | 1 |
| 154 | 8 | 4 | 3 | 2 |
| 155 | 10 | 5 | 2 | 1 |
| 156 | 10 | 2 | 3 | 2 |

As is clear from the comparison of the graph 101 in FIG. 8 and each graph in FIG. 16, in the case where the input directions of the signal voltages are uniform, the temperature distribution can be made uniform more effectively not only by changing the panel thickness according to the calorific values but also by providing the protrusion or the radiating fin so as to change the surface area of the substrate according to the calorific values.

Figure 17:
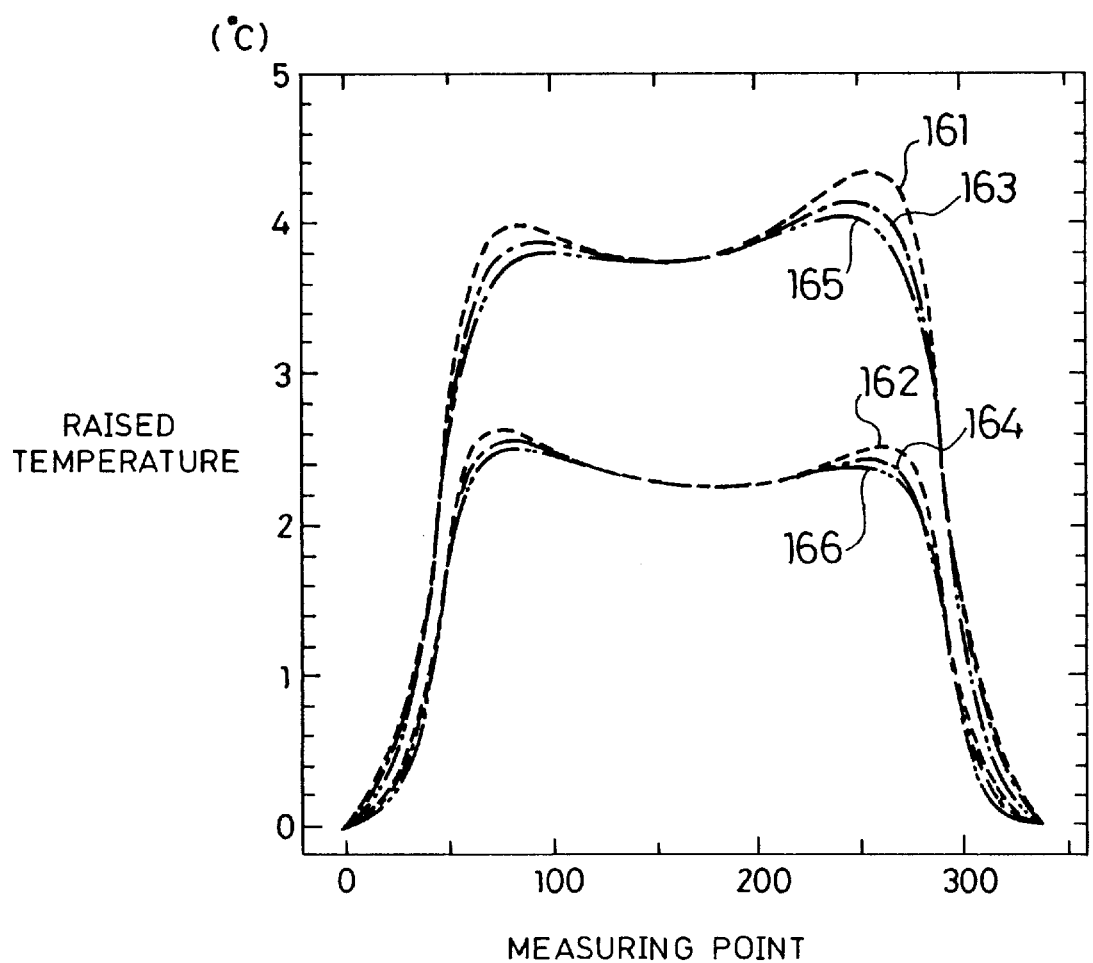
FIG. 17 is a graph which shows the raised temperatures at each measuring point in the case where the thickness and the surface area of the substrate are changed according to the calorific values, and the input directions of the signal voltages to the signal line electrodes are opposite alternately.
Figure 18A:
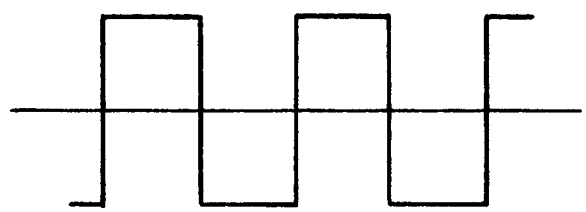
FIGS. 18(a) through 18(d) are waveform charts which show the signal voltages to be applied to the signal line electrodes in the liquid crystal panel according to still another embodiment of the present invention.
Figure 18B:
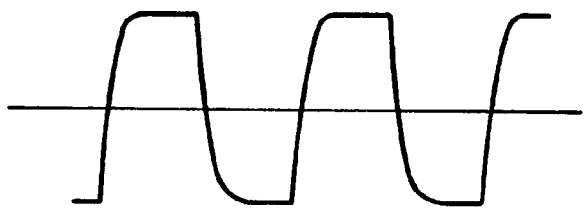
Figure 18C:
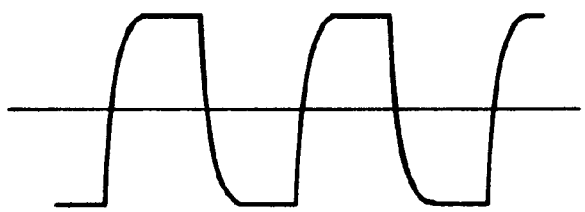
Figure 18D:
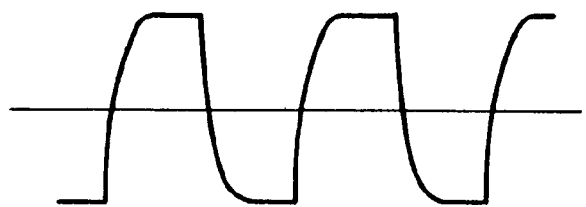
Figure 19:
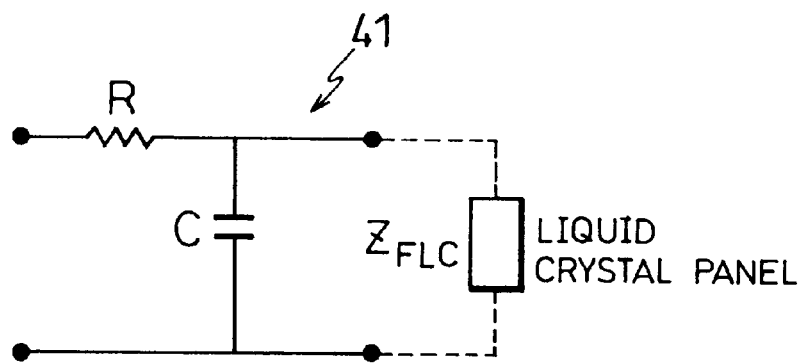
FIG. 19 is a circuit diagram of a low pass filter which is used for outputting the signal voltages shown in FIG. 18.

In addition, FIG. 17 shows the raised temperatures at each measuring point in the case where the input directions of the signal voltages to the signal line electrode group are opposite alternately as shown in FIG. 5(b) and the conditions of the panel thickness and the surface area of the substrate are the same as those in Table 1. In the liquid crystal panel which is used for the measurement in the graphs 161 through 166 shown in FIG. 17, as shown in FIG. 3(b) or 5(b), the input directions of the signal voltages are opposite alternately.

As is clear from the comparison of the graphs in FIG. 16 with the graphs in FIG. 17 correspondingly, the temperature distribution on the substrate can be made uniform more effectively by making the input directions of the signal voltages opposite alternately and by changing the panel thickness according to the calorific values and by providing the protrusion or the radiating fin so as to change the surface area of the substrate according to the calorific values.

As mentioned above, the temperature on the display screen of the liquid crystal panel can be made uniform by providing the protrusion, the radiating fin or the like so that the surface area on a portion of the substrate is changed according to the calorific values on the corresponding portion, namely, the surface area becomes relatively large in a portion where the calorific value is large and becomes relatively small in a portion where the calorific value is small. As a result, the driving property of the liquid crystal is prevented from becoming uneven, thereby making it possible to provide a liquid crystal panel obtaining the satisfactory display state.

EMBODIMENT 3

The following describes another embodiment of the present invention on reference to FIGS. 18 through 24.

The liquid crystal panel of the present embodiment includes a circuit (charge and discharge current suppressing means) which inputs a rectangular signal voltage waveform shown in FIG. 18(*a*) therein and outputs a signal voltage waveform in which steepness of the rising of polarity inversion is made dull as shown in FIG. 18(*b*). This circuit can be composed of a low pass filter 41, etc. shown in FIG. 19, for example. However, the liquid crystal panel of the present invention is not limited to the arrangement having the low pass filter, so various arrangements can be applied to the liquid crystal panel as long as the circuit has an effect of suppressing a charge and discharge current generated at the time of the polarity inversion by decreasing the changing ratio of the voltage waveform.

At this time, the signal voltage waveform, which is applied to a picture element located the closest to the input terminal of the signal voltages, is as shown in FIG. 18(*c*), and the signal voltage waveform, which is applied to a picture element located the farthest from the input terminal of the signal voltage is as shown in FIG. 18(*d*). Namely, as is clear from the comparison of these voltage waveforms, the driving waveform to be applied to each picture element positioned on the signal line electrodes is hardly distorted, and thus there never occurs trouble that driving of picture elements located far from the input terminal of the signal voltages becomes impossible.

Steepness of the voltage waveform can be adjusted by changing the time constant of the low pass filter. Namely, as the larger the time constant is set, the more dull the steepness at the time of polarity inversion can be made. As a result, as mentioned later, the charge and discharge current is decreased and thus the calorific value can be suppressed. However, when the time constant is set too large, the signal voltage waveform is closer to a triangular waveform, and the driving of the liquid crystal might be impossible. Therefore, it is necessary to set the time constant in a range where the liquid crystal is accurately driven.

Figure 20A:
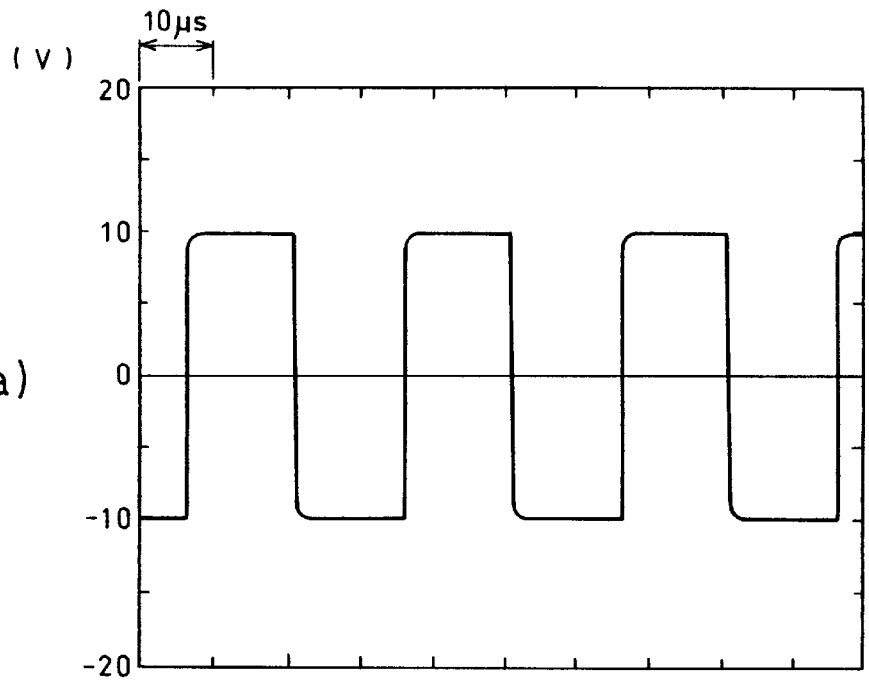
FIG. 20(a) is a waveform chart which shows the signal voltages to be inputted to the low pass filter.
Figure 20B:
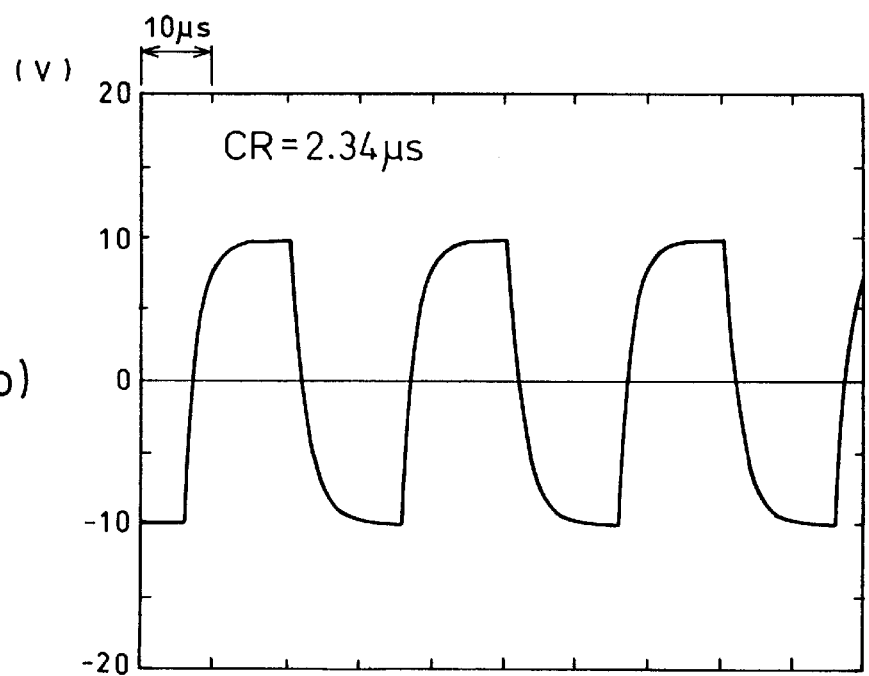
FIG. 20(b) is a waveform chart which shows the signal voltages to be outputted from the low pass filter.

For example, in the case where the time constant CR is 2.34 μs, a square signal voltage waveform shown in FIG. 20(*a*) is converted into a waveform shown in FIG. 20(*b*) so as to be applied to picture elements of the liquid crystal panel. The signal voltage waveform shown in FIG. 20(*b*) has a shape which is necessary for driving the liquid crystal, and has the effect that the calorific value is suppressed by decreasing the charge and discharge current.

As mentioned above, in the liquid crystal panel, the charge and discharge current accompanied by polarity inversion can be suppressed by dulling the steepness of the waveform of the signal voltages to be applied to the signal line electrodes. As a result, the calorific values on the picture elements can be suppressed, and thus the temperature distribution of the liquid crystal panel can be made uniform. The reason for this is described blow.

According to the equation 1, the calorific value of the liquid crystal panel is determined by the capacitance of the liquid crystal and the resistance value (electrode resistance value) of the ITO transparent electrode. Moreover, the waveform of the signal voltages to be applied is a continuous rectangular waveform basically, and the heat on the liquid crystal panel is generated by an ITO electrode current (charge and discharge current) which is supplied due to a potential difference which arises between the picture elements at the moment when electric charges are charged and discharged in the liquid crystal.

As represented by the following equation 3, a charge and discharge current from the n-numbered picture element from the input terminal of the signal voltages on the signal line electrodes to the n+1-numbered picture element flows the most when a potential difference Vn between the picture elements are changed steeply in time.

$$i_n(t) = C\frac{dV_n}{dt} [A] \qquad \text{Equation 3}$$

In addition, on the ITO electrode resistance of the n-numbered picture element, the calorific value generated due to the charge and discharge current is in proportion to the square of the current as represented by the following equation 4.

$$P_n(t) = R_{ito} \cdot i_n^2(t) [W] \qquad \text{Equation 4}$$

As is clear from the equation 4, in order to reduce the calorific value, either of the two methods can be used: (1) the method of reducing the electrode resistance value: and (2) the method of providing an effective circuit for intentionally reducing the charge and discharge current by the polarity inversion of the signal voltages. The liquid crystal panel of the present embodiment adopts the method (2).

The method (1) is seemed to be simple and easy, but it is not practically easy to reduce the electrode resistance value. This is because a metallic material, which can be used for forming a thin film through which a visible light passes sufficiently and whose resistance value is lower in some degree, is limited to a material such as indium. Moreover, even in the case where an electrode is formed together with another satisfactorily conductive metal, a number of the film forming processes is increased. As a result, the method (1) is disadvantageous from a viewpoint of the manufacturing cost. On the contrary, since the method (2) can be realized only by adding the effective circuit to the signal voltage output circuit, it is more profitable, simpler and easier than the method (1) from the view point of the manufacturing cost. Moreover, at the same time, power consumption of the panel can be reduced.

From a viewpoint of reducing a difference of the waveforms of the voltages to be applied to the picture elements of the signal line electrodes, it is effective to reduce a capacitive load of the liquid crystal panel by making the panel thickness thick or improving a material of the liquid crystal, for example. However, that the capacitive load is small means that the time constant of the picture elements is small, thereby increasing the charge and discharge current accompanying the polarity inversion of the voltage waveform. Namely, as a result, the calorific value becomes larger in proportion to the electrode resistance value, so the calorific value cannot be suppressed only by decreasing the capacitive load of the liquid crystal panel.

Figure 21:
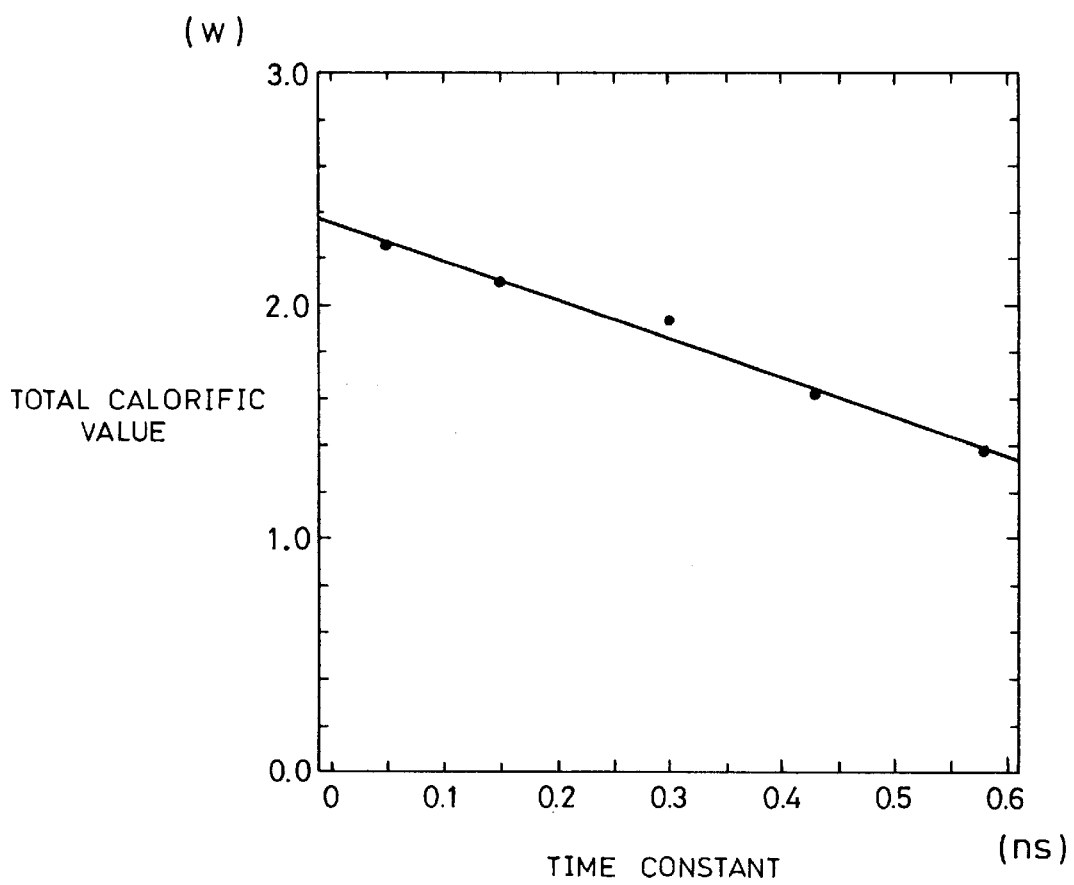
FIG. 21 is a graph which shows a relationship between a time constant and a total calorific value of the low pass filter.

FIG. 21 shows the results of measuring the total calorific value of the liquid crystal panel while changing the time constant of the low pass filter 41. Here, the signal voltages to be inputted to the low pass filter 41 was set to a rectangular wave, in which an amplitude voltage was 10 V and a line address frequency was 25 kHz, an electrostatic capacity C of the low pass filter 41 was set to 100 pF, and the resistance value R was set to 0.5–6.0 Ω, and the measurement was made. As is clear from FIG. 21, the total calorific value of the liquid crystal panel has a tendency to be reduced smaller as the time constant is set larger.

As mentioned above, by providing such a circuit that dulls the steepness of the waveform at the time of polarity inversion of the signal voltages, the increase in the charge and discharge current is suppressed, thereby making it possible to reduce the calorific value of each picture element. As a result, the total calorific value of the liquid crystal panel can be suppressed, and it is possible to provide the liquid crystal panel which prevents the variations of the driving property of the liquid crystal and obtains the more satisfactory display state.

Figure 22:
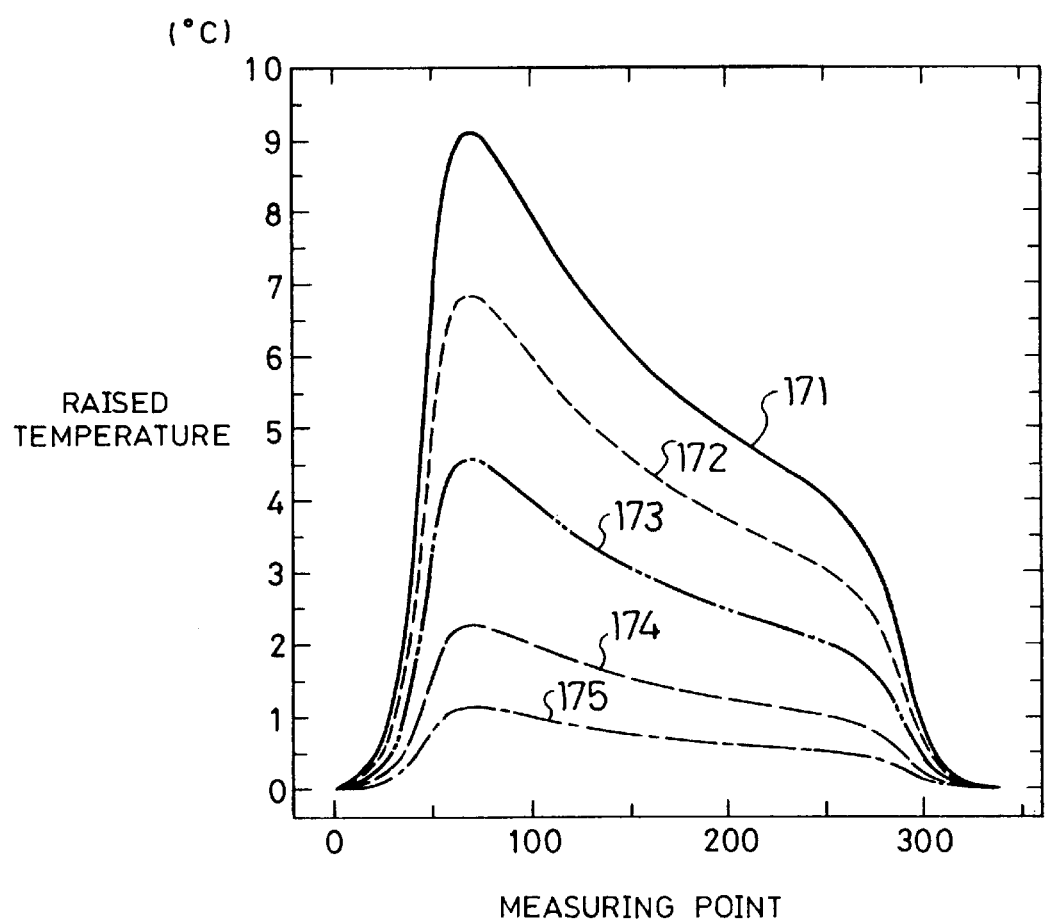
FIG. 22 is a graph which shows the raised temperatures at each measuring point in the case where the total calorific value is suppressed by the low pass filter.
Figure 23:
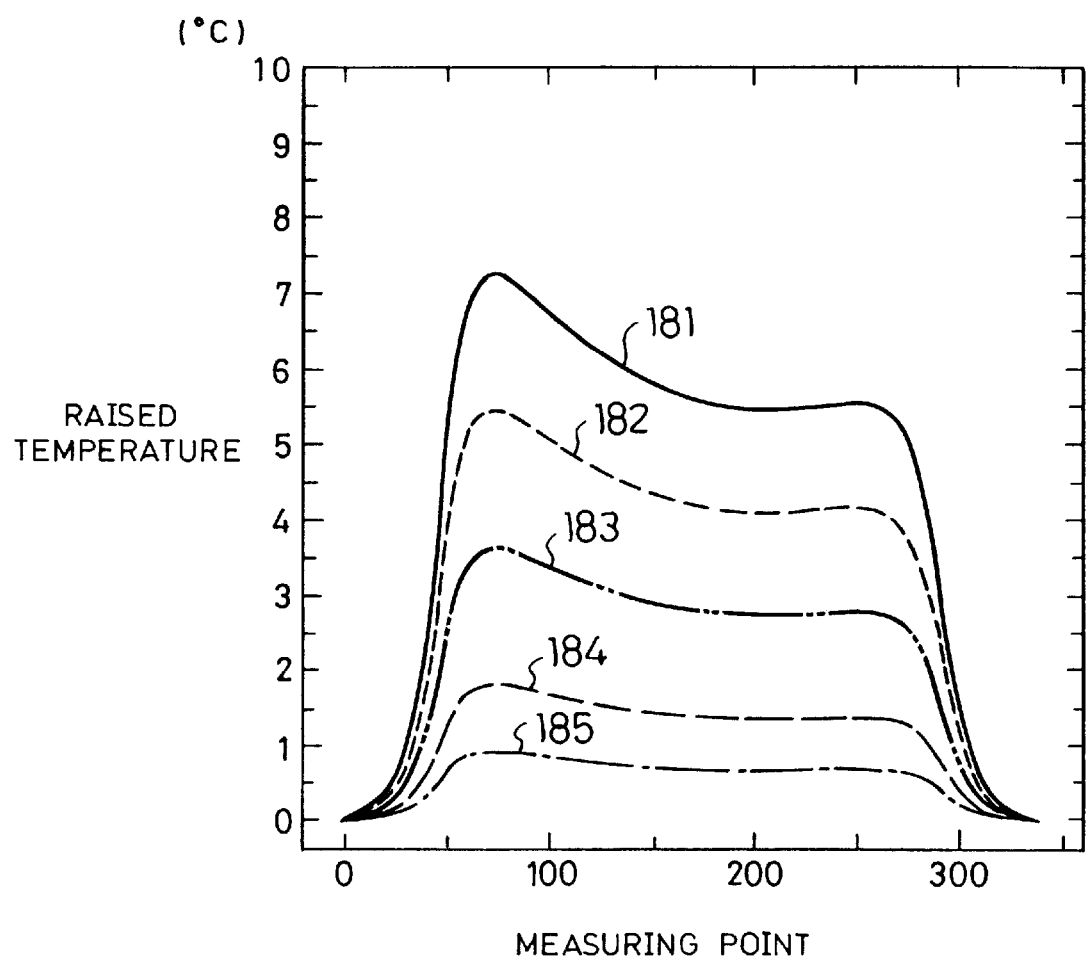
FIG. 23 is a graph which shows the raised temperatures at each measuring point in the case where the total calorific value is suppressed by the low pass filter, and the input directions of the signal voltages to the signal line electrodes are set as shown in FIG. 5(b).
Figure 24:
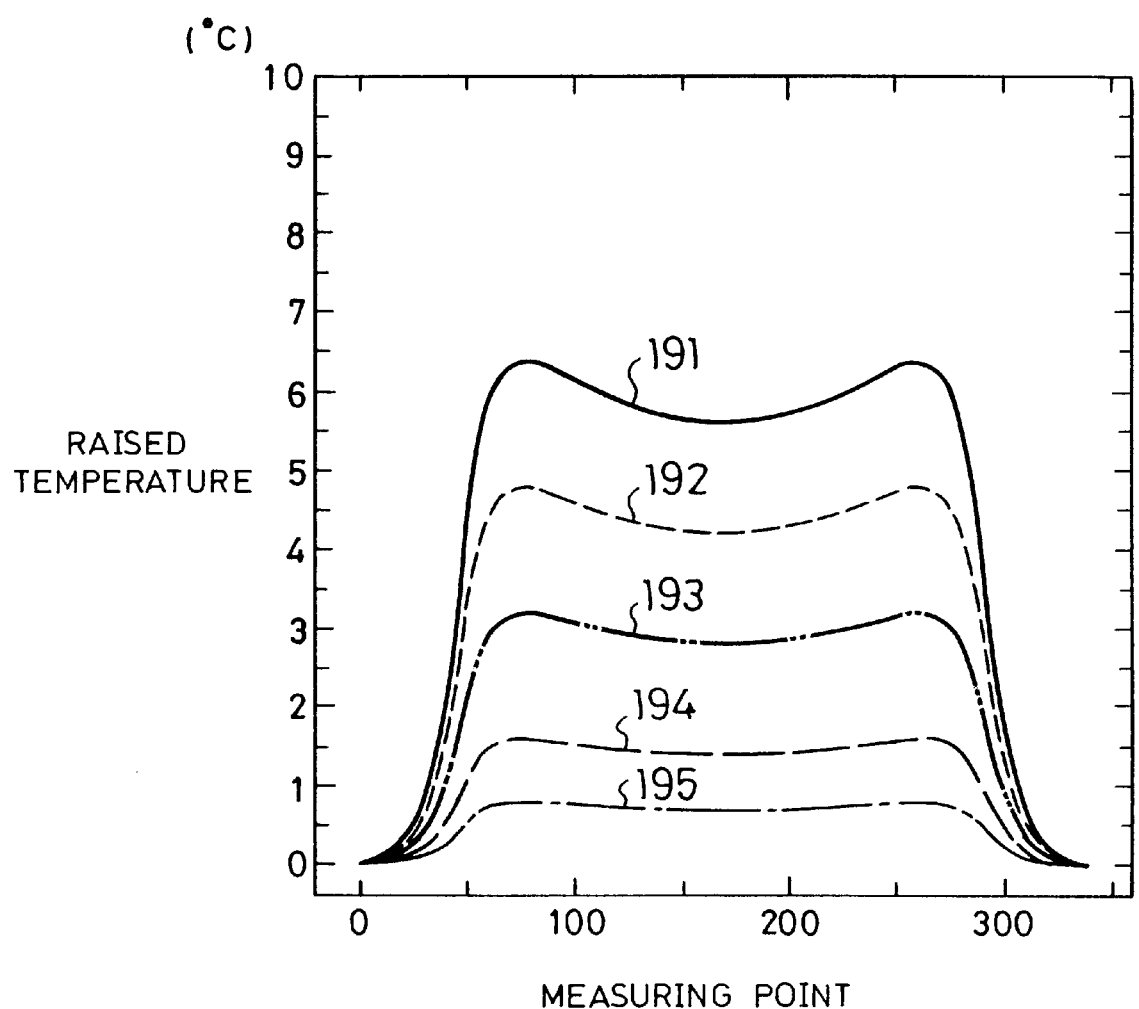
FIG. 24 is a graph which shows the raised temperatures at each measuring point in the case where the total calorific value is suppressed by the low pass filter and the input directions of the signal voltages to the signal line electrodes are set as shown in FIG. 5(c).

The arrangements described in the respective aforementioned embodiments can be combined with each other in the liquid crystal panel described in the present embodiment. For example, FIGS. 22 through 24 are graphs which show the raised temperatures at each measuring point in the case where the input directions of the signal voltages to the signal line electrodes are set as shown in FIGS. 5(a) through 5(c) in the liquid crystal panel having the low pass filter 41. Here, the liquid crystal panel which is the measurement model in FIGS. 22 through 24 is arranged so that a substrate is a plate as shown in FIG. 10(a), and it has the electrode structure shown in FIG. 4.

First, FIG. 22 shows the measured results in the case where the input directions of the signal voltages are set as shown in FIG. 5(a). A graph 171 in the drawing is an comparative example, and shows the raised temperatures in the case without a low pass filter. Moreover, graphs 172 through 175 respectively show the raised temperatures in the case where power consumption of the liquid crystal panel is reduced to ¾, ½, ¼ and ⅛ by suppressing the charge and discharge current.

In addition, FIG. 23 shows the measured results in the case where the input directions of the signal voltages are set as shown in FIG. 5(b). A graph 181 in the drawing is a comparative example, and shows the raised temperature in the case without a low pass filter. Moreover, graphs 182 through 185 show the raised temperatures in the case where power consumption of the liquid crystal panel is reduced to ¾, ½, ¼ and ⅛.

In addition, FIG. 24 shows the measured results in the case where the input directions of the signal voltages are set as shown in FIG. 5(c). A graph 191 in the drawing is a comparative example, and shows the raised temperatures in the case without a low pass filter. Moreover, graphs 192 through 195 show the raised temperatures in the case where power consumption of the liquid crystal panel is reduced to ¾, ½, ¼ and ⅛.

According to FIGS. 22 through 24, by suppressing the charge and discharge current and by setting input of the signal voltages to some signal line electrodes in the opposite direction as shown in FIG. 5(b), or more preferably as shown in 5(c), the power consumption of the liquid crystal panel can be reduced, and the rise in the temperature of the liquid crystal panel can be suppressed, and thus the temperature difference in the display screen can be small. As a result, it is possible to provide the liquid crystal panel which prevents the variations of the driving property of the liquid crystal due to the temperature difference and obtains the satisfactory display state.

In addition, the present invention is not limited to the aforementioned embodiments, so the embodiment can be variously changed within the scope of the invention. For example, the embodiment 1 explains the input method shown in FIG. 5(b) or 5(c) as concrete example in the case where some input directions of the signal voltages to some signal electrodes are made opposite, but the input directions are not limited to this, so they can be set suitably according to various factors such as the temperature distribution of the liquid crystal panel and the width of the signal line electrode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element, comprising: a scanning line electrode group and a signal line electrode group which are each composed of a plurality of electrodes, with each of the plurality of electrodes in the respective groups being arranged parallel and electrically insulated from each other, wherein the scanning line electrode group and the signal line electrode group are located so as to cross each other and liquid crystal intervenes between the electrode groups, and signal voltages are applied to some signal line electrodes of the signal line electrode group at points toward one end of the signal line electrode group while other signal voltages are applied to other signal line electrodes of the signal line electrode group at points toward an opposite end of the signal line electrode group.

2. The liquid crystal display element according to claim 1, wherein said liquid crystal is ferroelectric liquid crystal.

3. The liquid crystal display element according to claim 1, wherein said signal line electrode group or said scanning line electrode group has two kinds of electrodes with different width from each other so that tone display can be executed.

4. The liquid crystal display element according to claim 1, comprising charge and discharge current suppressing means for dulling steepness of a square waveform of signal voltages to be applied to the signal line electrodes.

5. The liquid crystal display element according to claim 1, wherein said signal line electrode group includes a plurality of electrode pairs, each pair being constituted by a wide signal line electrode and a narrow signal line electrode adjacent to the wide signal electrode, and signal voltages are applied to the wide signal line electrode belonging to one electrode pair and the wide signal electrode belonging to an adjacent electrode pair via respective points towards opposite ends of the signal line electrode group, and signal voltages are applied to the narrow signal line electrode belonging to the one electrode pair and the narrow signal line electrode belonging to the adjacent electrode pair via respective points towards the opposite ends of the signal line electrode group.

* * * * *